US011990093B2

(12) United States Patent
Na et al.

(10) Patent No.: US 11,990,093 B2
(45) Date of Patent: *May 21, 2024

(54) DISPLAY DEVICE

(71) Applicant: Samsung Display Co., LTD., Yongin-si (KR)

(72) Inventors: Ji Su Na, Yongin-si (KR); Yang Wan Kim, Hwaseong-si (KR); Jung Hun Yi, Gimcheon-si (KR); Min Woo Byun, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,651

(22) Filed: Mar. 6, 2023

(65) Prior Publication Data

US 2023/0206847 A1 Jun. 29, 2023

Related U.S. Application Data

(63) Continuation of application No. 17/671,859, filed on Feb. 15, 2022, now Pat. No. 11,600,228.

(30) Foreign Application Priority Data

Mar. 25, 2021 (KR) ........................ 10-2021-0038954

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01); *G09G 2310/08* (2013.01); *G09G 2330/021* (2013.01)

(58) Field of Classification Search
CPC ............... G09G 3/3233; G09G 3/3266; G09G 2300/0819; G09G 2300/0842;
(Continued)

(56) References Cited

U.S. PATENT DOCUMENTS 10,896,636 B2 1/2021 Pyun et al.
2014/0306945 A1* 10/2014 Kishi ....................... G09G 3/30 345/76
(Continued)

FOREIGN PATENT DOCUMENTS

KR 10-2014-0099164 8/2014
KR 10-2019-0024330 3/2019
(Continued)

OTHER PUBLICATIONS

Partial European Search Report for European Patent Application or Patent No. 22161295.5 dated Oct. 12, 2022.

*Primary Examiner* — Dong Hui Liang
(74) *Attorney, Agent, or Firm* — KILE PARK REED & HOUTTEMAN PLLC

(57) ABSTRACT

A display device includes pixels electrically connected to first scan lines, second scan lines, and emission lines, a first scan driver that applies first scan signals to the first scan lines, a second scan driver that applies second scan signals to the second scan lines, an emission control driver that applies emission signals to the emission lines, and a power supply that generates and outputs a first high voltage and a second high voltage. The second scan driver receives the first high voltage. The first scan driver and the emission control driver share the second high voltage.

20 Claims, 23 Drawing Sheets

(58) Field of Classification Search
CPC ... G09G 2300/0861; G09G 2300/0426; G09G 2320/043; G09G 2320/0233; G09G 2320/045
See application file for complete search history.

(56) References Cited

U.S. PATENT DOCUMENTS

| | | | | |
|---|---|---|---|---|
| 2017/0357353 | A1* | 12/2017 | Katsuta | G06F 3/04164 |
| 2018/0130407 | A1 | 5/2018 | Zhai | |
| 2018/0174525 | A1* | 6/2018 | Kim | G09G 3/3266 |
| 2019/0066598 | A1* | 2/2019 | Kim | G09G 3/3233 |

FOREIGN PATENT DOCUMENTS

| | | |
|---|---|---|
| KR | 10-2019-0143806 | 12/2019 |
| KR | 10-2020-0080056 | 7/2020 |
| KR | 10-2020-0083736 | 7/2020 |

* cited by examiner

STAW: STAWn, STAWn+1, ...

PCL: PCL1, PCL2
STAE: STAEk, STAEk+1, ...
RCL: RCL1, RCL2

DISPLAY DEVICE

CROSS-REFERENCE TO RELATED APPLICATION(S)

This is a continuation application based on currently U.S. patent application Ser. No. 17/671,859, filed on Feb. 15, 2022, now U.S. Pat. No. 11,600,228, the disclosure of which is incorporated herein by reference in its entirety. U.S. patent application Ser. No. 17/671,859 claims priority to and the benefit of Korean Patent Application No. 10-2021-0038954 under 35 U.S.C. § 119, filed on Mar. 25, 2021, in the Korean Intellectual Property Office (KIPO), the entire contents of which are incorporated herein by reference.

BACKGROUND

1. Technical Field

The disclosure relates to a display device.

2. Description of the Related Art

With the advance of information-oriented society, more and more demands are placed on display devices for displaying information in various ways. For example, display devices are employed in various electronic devices such as smartphones, digital cameras, laptop computers, navigation devices, and smart televisions. As examples of the display device, there are a liquid crystal display device, a field emission display device, an organic light emitting display device, and the like.

Among these display devices, the organic light emitting display device may include a light emitting element in which each pixel of a display panel may emit light by itself, a driving transistor that controls the amount of driving current supplied from a power line to the light emitting element according to a data voltage of a data line applied to a gate electrode, and transistors that act as a switch by being turned on or off according to a scan signal of a scan line and an emission signal of an emission line. In this case, the voltage of the scan line may be affected according to the change in the data voltage of the data line, and thus the voltage of the gate electrode of the driving transistor may fluctuate. In case that the voltage of the gate electrode of the driving transistor fluctuates, it is difficult for the light emitting element to emit light with a desired luminance.

SUMMARY

Aspects of the disclosure provide a display device capable of preventing a voltage of a gate electrode of a driving transistor from fluctuating.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment of the disclosure, a display device may include a plurality of pixels electrically connected to first scan lines, second scan lines, and emission lines, a first scan driver that applies first scan signals to the first scan lines, a second scan driver that applies second scan signals to the second scan lines, an emission control driver that applies emission signals to the emission lines, and a power supply that generates and outputs a first high voltage and a second high voltage. The second scan driver may receive the first high voltage. The first scan driver and the emission control driver share the second high voltage.

The display device may further comprise third scan lines, and a third scan driver that applies third scan signals to the third scan lines. The third scan driver may receive the second high voltage.

The display device may further comprise fourth scan lines, and a fourth scan driver that applies fourth scan signals to the fourth scan lines. The fourth scan driver may receive the second high voltage.

The display device may further comprise fourth scan lines, and a fourth scan driver that applies fourth scan signals to the fourth scan lines. The fourth scan driver may receive the first high voltage.

The power supply may generate and output a first low voltage and a second low voltage. The first scan driver and the third scan driver may share the second low voltage. The second scan driver, the fourth scan driver, and the emission control driver may share the first low voltage.

The display device may further comprise a display area in which the plurality of pixels are disposed and display an image, and a non-display area disposed adjacent the display area. The second scan driver may comprise a first sub-scan driver that applies second scan signals to the second scan lines and is disposed on a side of the non-display area, and a second sub-scan driver that applies second scan signals to the second scan lines and is disposed on another side opposite to one side of the non-display area.

The first scan driver and the emission control driver may be disposed on the side of the non-display area. The third scan driver and the fourth scan driver may be disposed on the another side of the non-display area.

The third scan driver and the emission control driver may be disposed on the side of the non-display area. The first scan driver and the fourth scan driver may be disposed on the another side of the non-display area.

The display device may further comprise data lines, a first driving voltage line, and a first initialization voltage line electrically connected to each of the plurality of sub-pixels. Each of the plurality of sub-pixels may comprise a light emitting element, a first transistor that applies a driving current to the light emitting element according to a voltage of a gate electrode, a second transistor that applies a data voltage of the data line to a first electrode of the first transistor according to a second scan signal of the second scan line, a third transistor that initializes the gate electrode of the first transistor to a first initialization voltage of the first initialization voltage line according to a first scan signal of the first scan line, and a fourth transistor that electrically connects the first driving voltage line and the first electrode of the first transistor according to the emission signal of the emission line.

The display device may further comprise a second initialization voltage line electrically connected to each of the plurality of sub-pixels. Each of the plurality of sub-pixels may further comprise a fifth transistor that electrically connects the gate electrode and a second electrode of the first transistor according to a third scan signal of the third scan line, a sixth transistor that initializes an anode electrode of the light emitting element to a second initialization voltage of the second initialization voltage line according to a fourth scan signal of the fourth scan line, and a seventh transistor that electrically connects the second electrode of the first transistor and the anode electrode of the light emitting element according to the emission signal of the emission line.

Each of the first transistor, the second transistor, the fourth transistor, the sixth transistor, and the seventh transistor may be a P-channel transistor. Each of the third transistor and the fifth transistor may be an N-channel transistor.

Each of the first transistor, the second transistor, and the sixth transistor may be a P-channel transistor. Each of the third transistor, the fourth transistor, the fifth transistor, and the seventh transistor may be an N-channel transistor.

The display device may further comprise a bias voltage line electrically connected to each of the plurality of sub-pixels. Each of the plurality of sub-pixels may further comprise an eighth transistor that applies a bias voltage of the bias voltage line to the first electrode of the first transistor according to a fourth scan signal of the fourth scan line.

According to an embodiment of the disclosure, a display device may comprise a sub-pixel electrically connected to a first scan line, a second scan line, an emission line, a data line, a first driving voltage line, and a first initialization voltage line. The sub-pixel may comprise a light emitting element, a first transistor that applies a driving current to the light emitting element according to a voltage of a gate electrode, a second transistor that applies a data voltage of the data line to a first electrode of the first transistor according to a second scan signal of the second scan line, a third transistor that initializes the gate electrode of the first transistor to a first initialization voltage of the first initialization voltage line according to a first scan signal of the first scan line, and a fourth transistor that electrically connects the first driving voltage line and the first electrode of the first transistor according to an emission signal of the emission line. The second transistor may be turned off during a period in which a first high voltage of the second scan signal is applied, and is turned on during a period in which a first low voltage of the second scan signal is applied. The third transistor may be turned on during a period in which a second high voltage of the first scan signal is applied, and is turned off during a period in which a second low voltage of the first scan signal is applied. The fourth transistor may be turned off during a period in which a second high voltage of the emission signal is applied, and is turned on during a period in which the first low voltage of the emission signal is applied.

The display device may further comprise a third scan line electrically connected to the sub-pixel. The sub-pixel may further comprise a fifth transistor that electrically connects the gate electrode and the first electrode of the first transistor according to a third scan signal of the third scan line. The fifth transistor may be turned on during a period in which the second high voltage of the third scan signal is applied, and may be turned off during a period in which a second low voltage of the third scan signal is applied.

The display device may further comprise a fourth scan line and a second initialization voltage line electrically connected to the sub-pixel. The sub-pixel may further comprise a sixth transistor that initializes an anode electrode of the light emitting element to a second initialization voltage of the second initialization voltage line according to a fourth scan signal of the fourth scan line. The sixth transistor may be turned on during a period in which the first low voltage of the fourth scan signal is applied.

The sub-pixel may further comprise a seventh transistor that electrically connects the second electrode of the first transistor and the anode electrode of the light emitting element according to the emission signal of the emission line. The seventh transistor may be turned off during a period in which the second high voltage of the emission signal is applied, and may be turned on during a period in which the first low voltage of the emission signal is applied.

The display device may further comprise a bias voltage line electrically connected to the sub-pixel. The sub-pixel may further comprise an eighth transistor that applies a bias voltage of the bias voltage line to the first electrode of the first transistor according to a fourth scan signal of the fourth scan line. The eighth transistor may be turned on during a period in which the first low voltage of the fourth scan signal is applied.

The sixth transistor may be turned off during a period in which the first high voltage or the second high voltage of the fourth scan signal is applied. The eighth transistor may be turned off during a period in which the first high voltage or the second high voltage of the fourth scan signal is applied.

According to an embodiment of the disclosure, a display device may comprise a sub-pixel electrically connected to a first scan line, a second scan line, an emission line, a data line, a first driving voltage line, and a first initialization voltage line. The sub-pixel may comprise a light emitting element, a first transistor that applies a driving current to the light emitting element according to a voltage of a gate electrode, a second transistor that applies a data voltage of the data line to a first electrode of the first transistor according to a second scan signal of the second scan line, a third transistor that initializes the gate electrode of the first transistor to a first initialization voltage of the first initialization voltage line according to a first scan signal of the first scan line, and a fourth transistor that electrically connects the first driving voltage line and the first electrode of the first transistor according to an emission signal of the emission line. The second transistor may be turned off during a period in which a first high voltage of the second scan signal is applied. The third transistor may be turned on during a period in which a second high voltage of the first scan signal is applied. The fourth transistor may be turned on during a period in which the second high voltage of the emission signal is applied.

The second transistor may be turned on during a period in which a first low voltage of the second scan signal is applied. The third transistor may be turned off during a period in which a second low voltage of the first scan signal is applied. The fourth transistor may be turned off during a period in which the first low voltage of the emission signal is applied.

According to an embodiment of the disclosure, a display device may comprise a sub-pixel electrically connected to a first scan line, an emission line, a data line, and a first driving voltage line. The sub-pixel may comprise a light emitting element, a first transistor that applies a driving current to the light emitting element according to a voltage of a gate electrode, and a second transistor that electrically connects the first driving voltage line and a first electrode of the first transistor according to an emission signal of the emission line. During a first period in which a data voltage of the data line fluctuates, the emission signal of the emission line fluctuates by a second voltage from a second high voltage. During a second period in which a threshold voltage is sampled at the gate electrode of the first transistor, the emission signal is restored to the second high voltage.

The display device may further comprise a second scan line and a first initialization voltage line electrically connected to the sub-pixel. The sub-pixel may further comprise a third transistor that applies a second initialization voltage of the first initialization voltage line to an anode electrode of the light emitting element according to a second scan signal of the second scan line. During the first period, a second scan signal of the second scan line may fluctuate by a first voltage from the second high voltage.

According to the display device according to the embodiments, by minimizing the potential fluctuation of the high voltage line according to the data voltage change of the data line, it may prevent the high voltage fluctuation of the emission line from influencing the gate electrode of the driving transistor by the parasitic capacitor between the emission line and the gate electrode of the driving transistor.

However, the effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
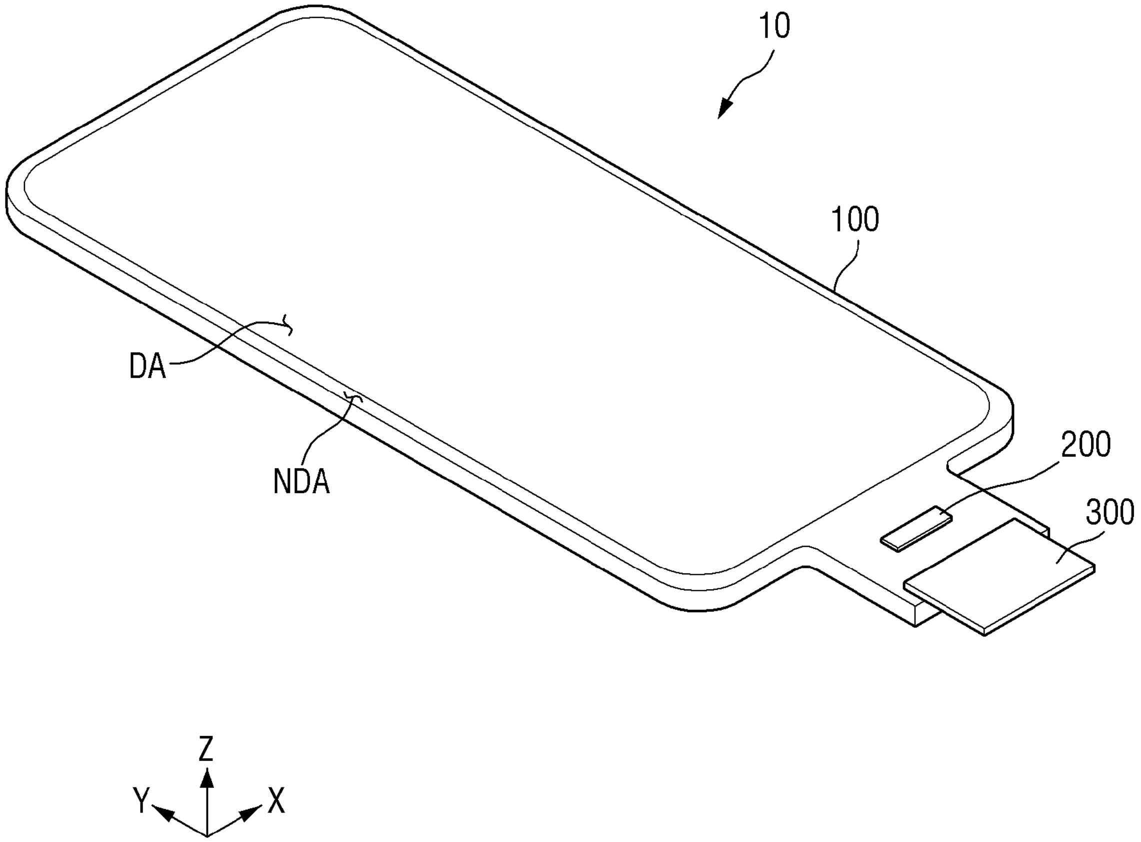
FIG. 1 is a schematic perspective view of a display device according to an embodiment.

In the following description, for the purposes of explanation, numerous details are set forth in order to provide a thorough understanding of various embodiments or implementations of the disclosure. As used herein "embodiments" and "implementations" are interchangeable words that are non-limiting examples of devices or methods employing one or more of the implementations or embodiments disclosed herein. It is apparent, however, that various embodiments may be practiced without these details or with one or more equivalent arrangements. In other instances, structures and devices may be shown in block diagram form in order to avoid unnecessarily obscuring various embodiments. Further, various embodiments may be different, but do not have to be exclusive. For example, shapes, configurations, and characteristics of an embodiment may be used or implemented in another embodiment without departing from the scope of the disclosure.

Unless otherwise specified, the illustrated embodiments are to be understood as providing features of varying detail of some or a number of ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings may be generally provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terms "and" and "or" may be used in the conjunctive or disjunctive sense and may be understood to be equivalent to "and/or."

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein interpreted accordingly.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or "to not overlap" another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terminology used herein is for the purpose of describing embodiments and is not intended to be limiting. As used herein, the singular forms, "a," "an," and "the" are intended to include the plural meanings as well, unless the context clearly indicates otherwise. Moreover, the terms "comprises," "comprising," "includes," and/or "including," "has," and/or "having," and/or variations thereof when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For example, "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

Various embodiments are described herein with reference to a plan view, sectional and/or exploded illustrations, block diagrams, etc., that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. Also, each block, unit, and/or module of some or a number of embodiments may be physically separated into two or more interacting and discrete blocks, units, and/or modules without departing from the scope of the disclosure. Further, the blocks, units, and/or modules of some or a number of embodiments may be physically combined into more complex blocks, units, and/or modules without departing from the scope of the disclosure.

Unless otherwise defined or implied herein, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and the disclosure and should not be interpreted in an ideal or excessively formal sense, unless clearly so defined herein.

FIG. 1 is a schematic perspective view of a display device 10 according to an embodiment.

The terms “above,” “top”,” and “top surface” as used herein refer to an upward direction (for example, a Z-axis direction) with respect to a display panel. The terms “below,” “bottom”,” and “bottom surface” as used herein refer to a downward direction (for example, a direction opposite to the Z-axis direction) with respect to the display panel. Further, “left”,” “right”,” “upper”,” and “lower” indicate directions when the display device 10 is viewed from above. For example, the term “left” indicates a direction opposite to an X-axis direction, the term “right” indicates the X-axis direction, the term “upper” indicates a Y-axis direction, and the term “lower” indicates a direction opposite to the Y-axis direction.

The display device 10 displays an image on a screen through a display area DA, and various devices including the display area DA may be included therein. Examples of the display device 10 may include, but are not limited to, a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a dashboard, a digital camera, a camcorder, an external billboard, an electronic billboard, various medical devices, various inspection devices, various household appliances such as a refrigerator and a washing machine including the display area DA, an Internet-of-Things device.

The display device 10 may be a light emitting display device such as an organic light emitting display device using an organic light emitting diode, a quantum dot display device including a quantum dot light emitting layer, an inorganic light emitting display device including an inorganic semiconductor, and a micro light emitting display device using a micro light emitting diode. Hereinafter, an organic light emitting display device will be described as an example of the display device, and the organic light emitting display device applied to the embodiment will be simply referred to as the display device 10 unless distinction is required. However, the embodiment is not limited to the organic light emitting display device, and other display devices mentioned above or known in the art may be applied within the same scope of technical spirit.

The display device 10 may include a display panel 100, a display driving circuit 200, and a circuit board 300.

The display panel 100 may be formed in a rectangular shape, in a plan view, having short sides in a first direction X and long sides in a second direction Y intersecting the first direction X. A corner where the short side of the first direction X and the long side of the second direction Y meet may be rounded to have a curvature or may be right-angled. The planar shape of the display panel 100 is not limited to the rectangular shape and may be formed in another polygonal shape, a circular shape, or an elliptical shape. The display panel 100 may be formed to be flat, but embodiments are not limited thereto, and for example, may include a curved portion formed at left and right ends and having a constant curvature or a varying curvature. As another example, the display panel 100 may be formed flexibly so that it can be curved, bent, folded, or rolled.

The display panel 100 may be divided into a display area DA displaying an image or video and a non-display area NDA disposed around the display area DA, in a plan view.

The display area DA may include pixels. The pixel is a basic part for displaying an image. The pixels may include, but are not limited to, a red pixel, a green pixel, and a blue pixel. The pixels may further include a white pixel. The pixels may be alternately arranged in a plan view. For example, the pixels may be arranged in a matrix, but the disclosure is not limited thereto.

The non-display area NDA may be disposed around the display area DA. A black matrix may be disposed in the non-display area NDA to prevent light, emitted from adjacent pixels, from leaking out. The non-display area NDA may include a driving driver for controlling or driving pixels and lines for applying an electric signal to each of the pixels. This will be described below with reference to FIGS. 2 and 3.

The non-display area NDA may surround the display area DA as illustrated in FIG. 1. For example, the display area DA may be formed in a quadrilateral shape, and the non-display area NDA may be disposed around four sides of the display area DA. However, the disclosure is not limited thereto, and the display area DA may be partially surrounded by the non-display area NDA. For example, the non-display area NDA may be disposed only around three sides of the display area DA. In this case, the other side of the display area DA may form an edge of the display device 10.

The display driving circuit 200 may be formed as an integrated circuit (IC) and attached onto the display panel by a chip on glass (COG) method, a chip on plastic (COP) method, or an ultrasonic bonding method, but the disclosure is not limited thereto. For example, the display driving circuit 200 may be attached to the circuit board 300.

The circuit board 300 may be attached onto pads DP using an anisotropic conductive film. Accordingly, lead lines of the circuit board 300 may be electrically disposed on the pads DP. The circuit board 300 may be a flexible printed circuit board, a printed circuit board, or a flexible film such as a chip on film.

Figure 2:
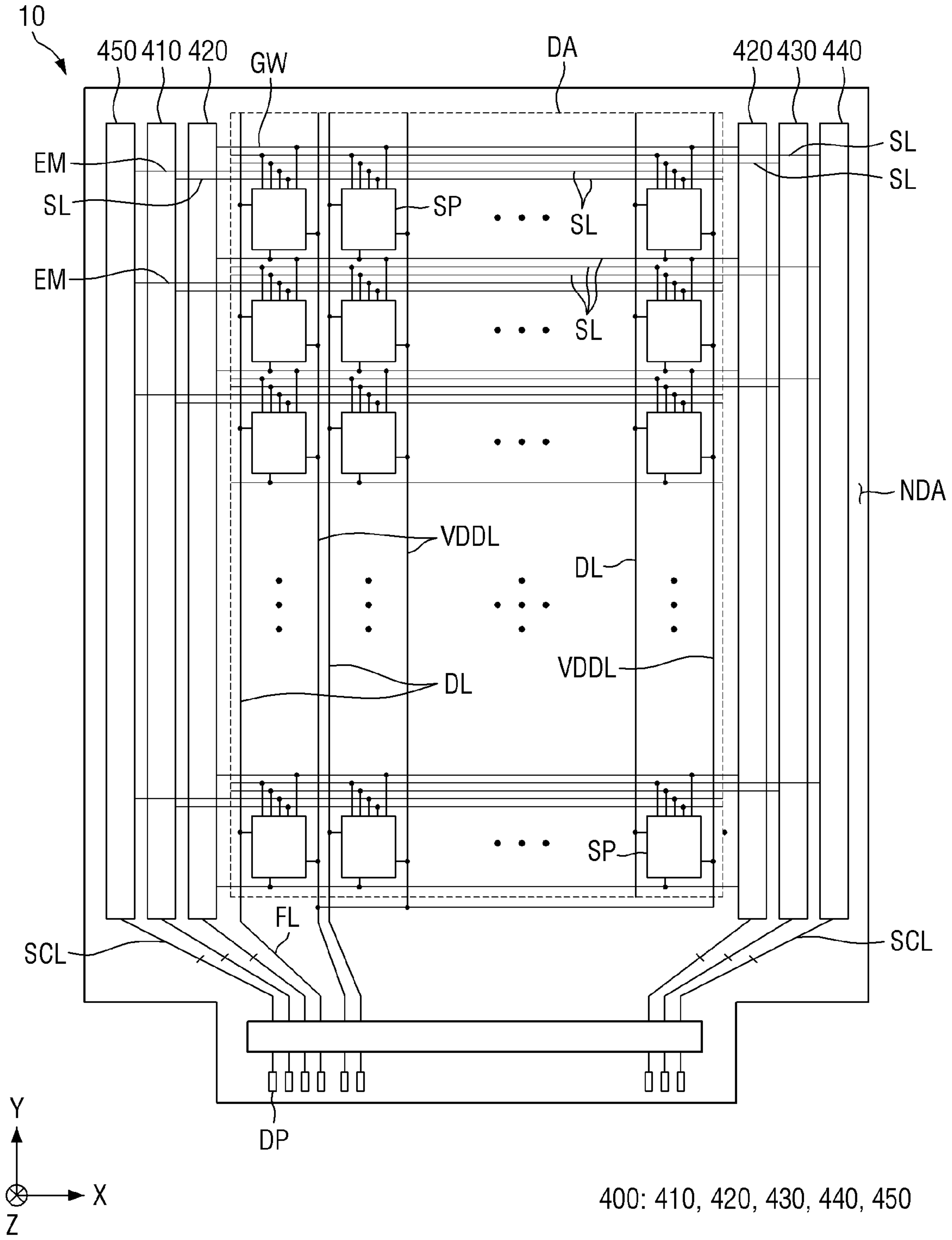
FIG. 2 is a schematic plan view of a display device according to an embodiment.
Figure 3:
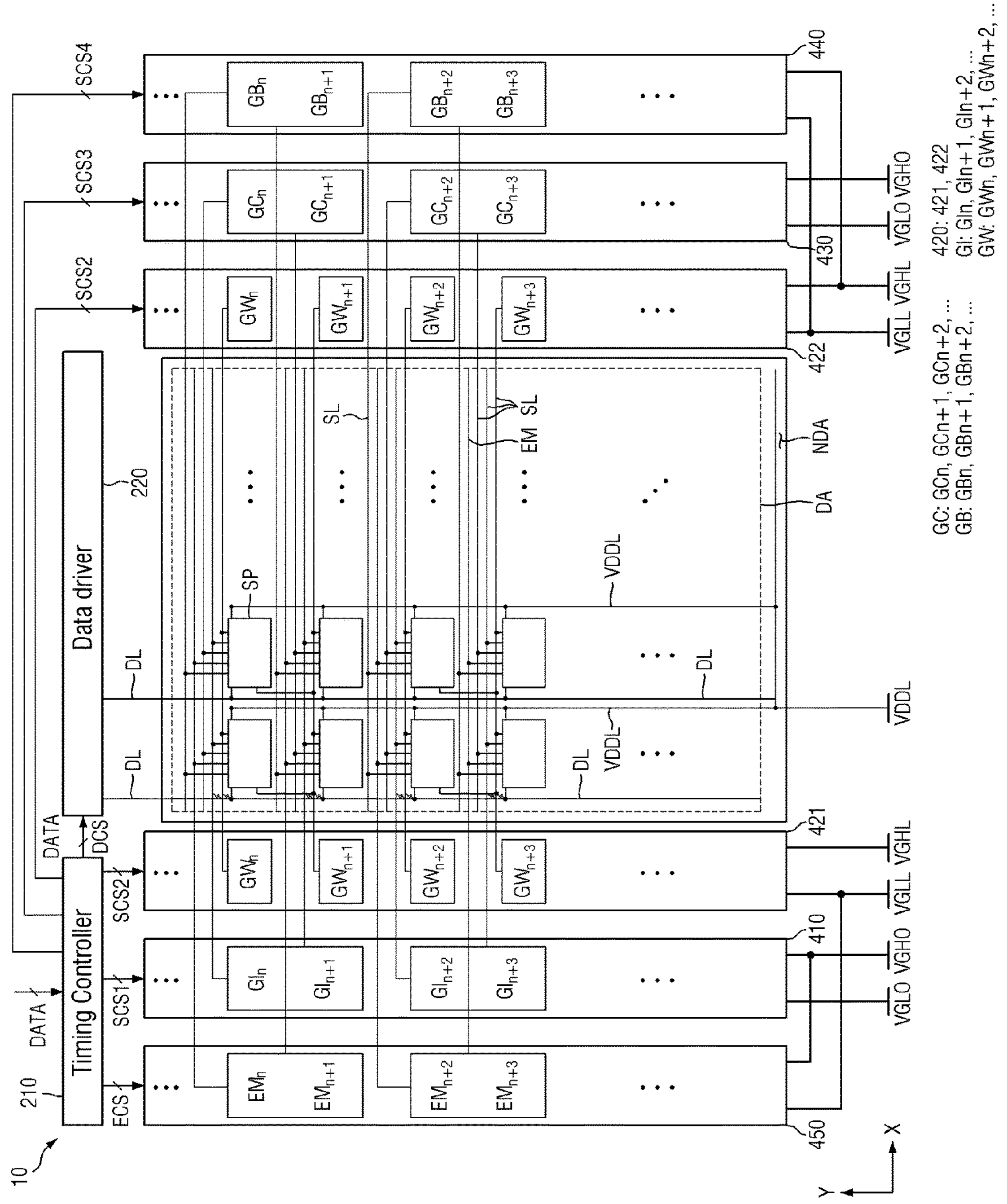
FIG. 3 is a schematic block diagram of a display device according to an embodiment.

FIG. 2 is a schematic plan view of a display device according to an embodiment. FIG. 3 is a schematic block diagram of a display device according to an embodiment.

Referring to FIGS. 2 and 3, the display panel 100 may include sub-pixels SP, and scan lines SL, emission lines EM, and data lines DL, and a first driving voltage line VDDL electrically connected to the sub-pixels SP. The scan lines SL and the emission lines EM may extend in the first direction X, and the data lines DL and the first driving voltage line VDDL may extend in the second direction Y intersecting the first direction X. The first driving voltage line VDDL may extend in the second direction Y in the display area DA. The first driving voltage lines VDDL may be electrically connected to each other in the non-display area NDA.

Each of the sub-pixels SP may be electrically connected to at least one of the scan lines SL, at least one of the data lines DL, at least one of the emission lines EM, and the first driving voltage line VDDL. In FIG. 2, it is illustrated that each of the sub-pixels SP is electrically connected to four scan lines SL, a data line DL, an emission line EM, and the first driving voltage line VDDL, but the embodiments are not limited thereto. For example, each of the sub-pixels SP may be electrically connected to three or fewer scan lines SL instead of four scan lines SL, or may be electrically connected to five or more scan lines SL.

Each of the sub-pixels SP may include a driving transistor, at least one transistor, a light emitting element, and a capacitor. The driving transistor and the at least one transistor may be thin-film transistors. The at least one transistor may be turned on or off according to a scan signal applied from a scan line to act as a switching element. For example, in case that a transistor disposed between the data line and the gate electrode of the driving transistor is turned on by a scan signal, the data voltage of the data line may be applied to the gate electrode of the driving transistor. The light emitting element may be an organic light emitting diode including a first electrode, an organic light emitting layer, and a second electrode. The light emitting element may emit light according to the driving current of the driving transistor. The capacitor may serve to keep constant the data voltage applied to the gate electrode of the driving transistor.

As illustrated in FIG. 3, the display driving circuit 200 may include a timing controller 210, a data driver 220, and voltage lines.

The timing controller 210 may receive digital video data DATA and timing signals from the circuit board 300. The timing controller 210 may generate scan control signals SCS1, SCS2, SCS3, and SCS4 for controlling an operation timing of each of scan drivers 410, 420, 430, and 440 according to the timing signals, may generate an emission control signal ECS for controlling an operation timing of an emission control driver 450, and may generate a data control signal DCS for controlling an operation timing of the data driver 220. For example, the timing controller 210 may generate the first scan control signal SCS1, the second scan control signal SCS2, the third scan control signal SCS3, and the fourth scan control signal SCS4 according to the timing signals, may output the first scan control signal SCS1 to the first scan driver 410, may output the second scan control signal SCS2 to the second scan driver 420, may output the third scan control signal SCS3 to the third scan driver 430, and may output the fourth scan control signal SCS4 to the fourth scan driver 440.

The timing controller 210 may output the scan control signals SCS1, SCS2, SCS3, and SCS4 to the scan drivers 410, 420, 430, and 440, respectively, through scan control lines SCL, and may output the emission control signal ECS to the emission control driver 450. The timing controller 210 may output the digital video data DATA and the data control signal DCS to the data driver 220.

The data driver 220 may convert the digital video data DATA into analog data voltages to output the analog data voltages to the data lines DL through fan-out lines FL.

Each of the voltage lines may be supplied with a voltage from a power supply unit (or power supply, not shown). The voltage lines may include the first driving voltage line VDDL for applying a first driving voltage Vdd, a first high-voltage line VGHL for applying a first high voltage VGH1, a first low-voltage line VGLL for applying a first low voltage VGL1, a second high-voltage line VGHO for applying a second high voltage VGH2, and a second low-voltage line VGLO for applying a second low voltage VGL2. Each of the first high-voltage line VGHL, the first low-voltage line VGLL, the second high-voltage line VGHO, and the second high-voltage line VGHO will be described in detail with reference to FIG. 4.

The voltage lines may further include a second driving voltage line VSSL (see FIG. 6) supplying a second driving voltage to the cathode electrode of the organic light emitting diode of each of the sub-pixels SP, and a bias voltage line VEHL (see FIG. 6) supplying a bias voltage to the source electrode of the driving transistor of each of the sub-pixels SP.

The first driving voltage may be a high-potential voltage for driving the organic light emitting diode, and the second driving voltage may be a low-potential voltage for driving the organic light emitting diode. For example, the first driving voltage may have a higher potential than the second driving voltage.

The bias voltage may be a voltage for setting an operating point of the driving transistor in case that the frequency is varied, and may be a voltage that may be optionally set. According to an embodiment, the bias voltage may have a potential greater than the first driving voltage, but is not limited thereto. For example, the bias voltage may have a potential smaller than the first driving voltage.

In the non-display area NDA, a scan driving circuit 400 for applying scan signals to the scan lines SL, the fan-out lines FL between the data lines DL and the display driving circuit 200, and the pads DP electrically connected to the display driving circuit 200 may be disposed. The display driving circuit 200 and the pads DP may be disposed adjacent to an edge of a side (e.g., a lower side) of the display panel 100.

The scan driving circuit 400 may be electrically connected to the display driving circuit 200 through scan control lines SCL. The scan driving circuit 400 may receive the scan control signals SCS1, SCS2, SCS3, and SCS4 and the emission control signal ECS from the display driving circuit 200 through the scan control lines SCL.

The scan driving circuit 400 may generate scan signals respectively according to the scan control signals SCS and may sequentially output the scan signals to the scan lines SL. The emission control driver 450 may generate emission signals according to the emission control signal ECS and may sequentially output the emission signals to the emission lines EM.

The scan driving circuit 400 may include thin-film transistors. The scan driving circuit 400 and the thin-film transistors of the sub-pixels SP may be formed on the same layer. The scan driving circuit 400 may be disposed in the non-display area NDA on both sides (for example, left and right sides) of the display area DA. Through such a structure, it may be advantageous in reducing the length of the non-display area NDA in the first direction X on each of both sides of the display area DA. However, the embodiments are not limited thereto. For example, the scan driving circuit 400 may be disposed on either the left side or the right side of the display area DA.

The scan driving circuit 400 may include the first scan driver 410, the second scan driver 420, the third scan driver 430, the fourth scan driver 440, and the emission control driver 450.

FIGS. 2 and 3 illustrate that the second scan driver 420 includes a first sub-scan driver 421 disposed on a side of the non-display area NDA, for example, on the left side of the non-display area NDA, and a second sub-scan driver 422 disposed on another side of the non-display area NDA, for example, on the right side of the non-display area NDA, and that each of the first sub-scan driver 421 and the second sub-scan driver 422 applies a scan signal, but the disclosure is not limited thereto. The scan driving circuit 400 may include one second scan driver 420 and may be disposed on either one side or another side of the non-display area DA.

The first scan driver 410 and the third scan driver 430 may be disposed on different sides of the non-display area NDA. For example, as illustrated in FIG. 3, in case that the first scan driver 410 is disposed on a side of the non-display area NDA, the third scan driver 430 may be disposed on another side of the non-display area NDA, and conversely, in case that the first scan driver 410 is disposed on another side of the non-display area NDA, the third scan driver 430 may be disposed on a side of the non-display area NDA.

The fourth scan driver 440 and the emission control driver 450 may be disposed on different sides of the non-display area NDA. For example, as illustrated in FIG. 3, in case that the emission control driver 450 is disposed on a side of the non-display area NDA, the fourth scan driver 440 is disposed on another side of the non-display area NDA, and conversely, in case that the emission control driver 450 is disposed on another side of the non-display area NDA, the fourth scan driver 440 may be disposed on a side of the non-display area NDA.

At least two voltage lines of the voltage lines VGHL, VGLL, VGHO, and VGLO for applying a voltage to the scan lines SL may be electrically connected to each of the scan drivers 410, 420, 430, and 440. The voltage lines VGHO and VGLL for applying a voltage to the emission lines EM may be electrically connected to the emission control driver 450.

In case that the transistors of each of the sub-pixels SP include at least one N-channel transistor and at least one P-channel transistor, scan signals to be applied to the respective gate electrodes of the N-channel transistor and the P-channel transistor may be different. Accordingly, the scan lines electrically connected to the respective gate electrodes of the N-channel transistor and the P-channel transistor should be divided, and accordingly, the scan driver may be divided.

According to an embodiment, the first scan driver 410 and the third scan driver 430 may be scan drivers for applying a scan signal to the N-channel transistor, and the second scan driver 420, the fourth scan driver 440, and the emission control driver 450 may be drivers for applying a scan signal to the P-channel transistor.

The second high-voltage line VGHO and the second low-voltage line VGLO may be electrically connected to the first scan driver 410 and the third scan driver 430, respectively. The first high-voltage line VGHL and the first low-voltage line VGLL may be electrically connected to the second scan driver 420 and the fourth scan driver 440, respectively. Each of the first low-voltage line VGLL and the second high-voltage line VGHO may be electrically connected to the emission control driver 450.

The first high voltage VGH1 applied from the first high-voltage line VGHL may be a first gate-off voltage Voff1 for turning off the P-channel transistor, and the first low voltage VGL1 applied from the first low-voltage line VGLL may be a first gate-on voltage Von1 for turning on the P-channel transistor. However, the first high voltage VGH1 may be used to turn on the N-channel transistor, or the first low voltage VGL1 may be used to turn off the N-channel transistor.

The second high voltage VGH2 applied from the second high-voltage line VGHO may be a second gate-on voltage Von2 for turning on the N-channel transistor, and the second low voltage VGL2 applied from the second low-voltage line VGLO may be a second gate-off voltage Voff2 for turning off the N-channel transistor. However, the second high voltage VGH2 may be used to turn off the P-channel transistor, or the second low voltage VGL2 may be used to turn on the P-channel transistor.

The magnitude of the first high voltage VGH1 and the magnitude of the second high voltage VGH2 may be substantially the same, and the magnitude of the first low voltage VGL1 and the magnitude of the second low voltage VGL2 may be substantially the same, but the disclosure is not limited thereto. The magnitude of the first high voltage VGH1 and the magnitude of the second high voltage VGH2 may be different, and the magnitude of the first low voltage VGL1 and the magnitude of the second low voltage VGL2 may be different.

In this way, in case that the voltage lines respectively electrically connected to the scan driver for driving the N-channel transistor and the scan driver for driving the P-channel transistor are different, it may be advantageous in reducing the interference between scan signals applied to the N-channel transistor and scan signals applied to the P-channel transistor.

The scan lines SL and the data lines DL intersect each other in the display area DA, and a first parasitic capacitor Cpr1 may be formed in each gap between the scan lines SL and the data lines DL that intersect each other as illustrated in FIG. 3. Accordingly, scan signals being outputted from the scan lines SL may be coupled (or connected) according to the data signal outputted from the data line DL.

Voltage fluctuations due to the coupling between the data line DL and the scan lines SL may affect the voltage of each of the voltage lines VGLL, VGHL, VGLO, and VGHO according to the voltage being outputted from each of the scan drivers 410, 420, 430, and 440.

For example, because in each of the second scan signals, the period having the first low voltage VGL1 is shorter than the period having the first high voltage VGH1, voltage fluctuations due to coupling between the data line DL and second scan lines GW (see FIG. 6) may occur in the first high-voltage line VGHL. In this case, the voltage of the first low-voltage line VGLL may be maintained substantially constant at the first low voltage VGL1. For example, the first low voltage line VGLL may be relatively stable from voltage fluctuations according to the data signal compared to the first high-voltage line VGHL.

Similarly, because in each of first scan signals GI (see FIG. 6), the period having the second high voltage VGH2 is shorter than the period having the second low voltage VGL2, voltage fluctuations due to coupling between the data line DL and first scan lines GI may occur in the second low-voltage line VGLO. In this case, the voltage of the second high-voltage line VGHO may be maintained substantially constant at the second high voltage VGH2. For example, the second high voltage line VGHO may be relatively stable from voltage fluctuations according to the data signal compared to the second low-voltage line VGLO.

Accordingly, in case that the first low-voltage line VGLL and the second high-voltage line VGHO are electrically connected to the emission control driver 450, since the emission signal outputted from the emission control driver 450 may have the first low voltage VGL1 applied from the first low-voltage line VGLL or the second high voltage VGH2 applied from the second high-voltage line VGHO, it may be advantageous in reducing voltage fluctuations due to the data signal of the data line DL.

Figure 4:
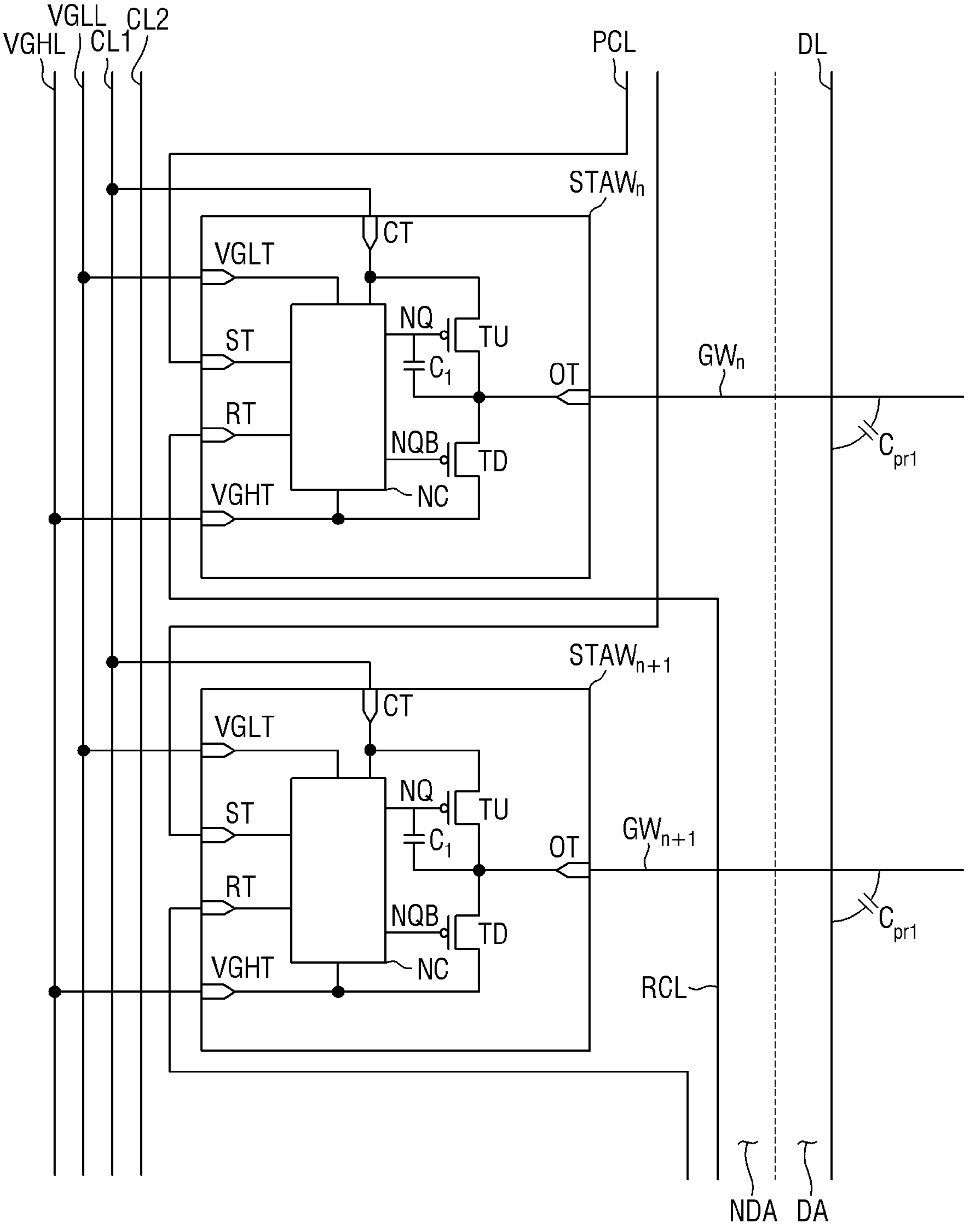
FIG. 4 is a schematic block diagram according to an example of stages of a second scan driver of FIG. 3.

FIG. 4 is a schematic block diagram according to an example of stages of a second scan driver of FIG. 3.

In FIG. 4, only two stages STAWn and STAWn+1 of the second scan driver 420 are illustrated for simplicity of description.

The second scan driver 420 may include the stages STAW that are dependently electrically connected. The number of stages STAW of the second scan driver 420 may be the same as the number of second scan lines GW.

The stages STAW of the second scan driver 420 may output a second scan signal. For example, the $n^{th}$ (n is a positive integer) stage STAWn of the second scan driver 420 may be electrically connected to a second scan line GWn electrically connected to each of the sub-pixels SP in an $n^{th}$ row and may output a second scan signal. The $(n+1)^{th}$ stage STAWn+1 of the second scan driver 420 may be electrically connected to a second scan line GWn+1 electrically connected to each of the sub-pixels SP in an $(n+1)^{th}$ row and may output a second scan signal.

Each of the stages STAWn and STAWn+1 of the second scan driver 420 may include, as illustrated in FIG. 4, a pull-up node NQ, a pull-down node NQB, a pull-up transistor TU that is turned on in case that the pull-up node NQ has a gate-on voltage, a pull-down transistor TD that is turned on in case that the pull-down node NQB has a gate-on voltage, a node controller NC for controlling the charging and discharging of the pull-up node NQ and the pull-down node NQB, and an output terminal OT.

The output terminal OT may be electrically connected to any of the second scan lines GW. The stages STAW may be sequentially electrically connected to the second scan lines GW. For example, the output terminal OT of the $n^{th}$ stage STAWn may be electrically connected to the second scan line GWn of an $n^{th}$ row, and the output terminal OT of the $(n+1)^{th}$ stage STAWn+1 may be electrically connected to the second scan line GWn+1 of an $(n+1)^{th}$ row.

The node controller NC may include thin-film transistors, a start terminal ST, a reset terminal RT, a gate-on voltage terminal VGLT, a gate-off voltage terminal VGHT, and a clock terminal CT. The start terminal ST may be electrically connected to a front-end carry line PCL to which an output signal of a front-end stage is applied. The reset terminal RT may be electrically connected to a rear-end carry line RCL to which an output signal of a rear-end stage is inputted. The gate-on voltage terminal VGLT may be electrically connected to the first low-voltage line VGLL for applying the first low voltage VGL1. The gate-off voltage terminal VGHT may be electrically connected to the first high-voltage line VGHL for applying the first high voltage VGH1. In this case, the first low voltage VGL1 may be the first gate-on voltage Von1 for turning on the P-channel transistor, and the first high voltage VGH1 may be the first gate-off voltage Voff1 for turning off the P-channel transistor.

The clock terminal CT may be electrically connected to one of a first clock line CL1 to which the first clock signal is applied and a second clock line CL2 to which the second clock signal is applied. The stages STAW may be alternately connected to the first clock line CL1 and the second clock line CL2. For example, in case that the clock terminal CT of the $n^{th}$ stage STAWn is electrically connected to the first clock line CL1, the clock terminal CT of the $(n+1)^{th}$ stage STAWn+1 may be electrically connected to the second clock line CL2. FIG. 4 illustrates that the stages STAWn and STAWn+1 are alternately electrically connected to the two clock lines CL1 and CL2, but the disclosure is not limited thereto. For example, the stages STAWn and STAWn+1 may be alternately electrically connected to three or more clock lines.

The node controller NC may control the charging and discharging of the pull-up node NQ and the pull-down node NQB according to an output signal of the front-end stage inputted to the start terminal ST. In order to stably control the output of the stage, the node controller NC may cause the pull-down node NQB to have a gate-off voltage in case that the pull-up node NQ has a gate-on voltage, and cause the pull-up node NQ to have a gate-off voltage in case that the pull-down node NQB has a gate-on voltage. To this end, the node controller NC may include thin-film transistors.

The pull-up transistor TU may be turned on in case that the pull-up node NQ has a gate-on voltage, and may output any of clock signals inputted to the clock terminal CT to the output terminal OT. The pull-down transistor TD may be turned on in case that the pull-down node NQB has a gate-on voltage, and may output the voltage of the gate-off voltage terminal to the output terminal OT.

Each of the stages STAWn and STAWn+1 may further include a first capacitor C1 disposed between the pull-up node NQ and the output terminal OT. The first capacitor C1 may maintain a potential difference between the gate electrode of the pull-up transistor TU and the output terminal OT during a period in which the pull-up transistor TU is turned on.

FIG. 4 illustrates that each of the stages STAW of the second scan driver 420 outputs a second scan signal to a second scan line GW, but the disclosure is not limited thereto. For example, each of the stages STAW of the second scan driver 420 may include two or more node controllers NC, similar to stages STAE of the emission control driver 450 of FIG. 5 to be described below, and may output the second scan signals to each of two or more second scan lines GW.

On the other hand, each of the second scan lines GW intersects the data line DL in the display area DA, and the first parasitic capacitor Cpr1 may be formed between the second scan line GW and the data line DL that intersect each other. Accordingly, in case that the data signal of the data line DL fluctuates, the voltage being outputted to the second scan line GW may fluctuate.

For example, in case that the voltage magnitude of the data signal increases during a period in which the second scan signal of the $n^{th}$ row has the first high voltage VGH1, the voltage of the first high-voltage line VGHL for applying the first high voltage VGH1 due to the coupling of the data line DL and the second scan line GWn of the $n^{th}$ row may also increase and then may be restored to the original voltage magnitude. However, the first low-voltage line VGLL is electrically connected to the $n^{th}$ stage STAWn of the second scan driver 420 but is in a short-circuited state, and thus there is no effect on the first low voltage VGL1 of the first low-voltage line VGLL.

Conversely, in case that the voltage magnitude of the data signal decreases during a period in which the second scan signal of the $n^{th}$ row has the first high voltage VGH1, the voltage of the first high-voltage line VGHL for applying the first high voltage VGH1 due to the coupling of the data line DL and the second scan line GWn of the $n^{th}$ row may also decrease and be restored to the original voltage magnitude.

Figure 5:
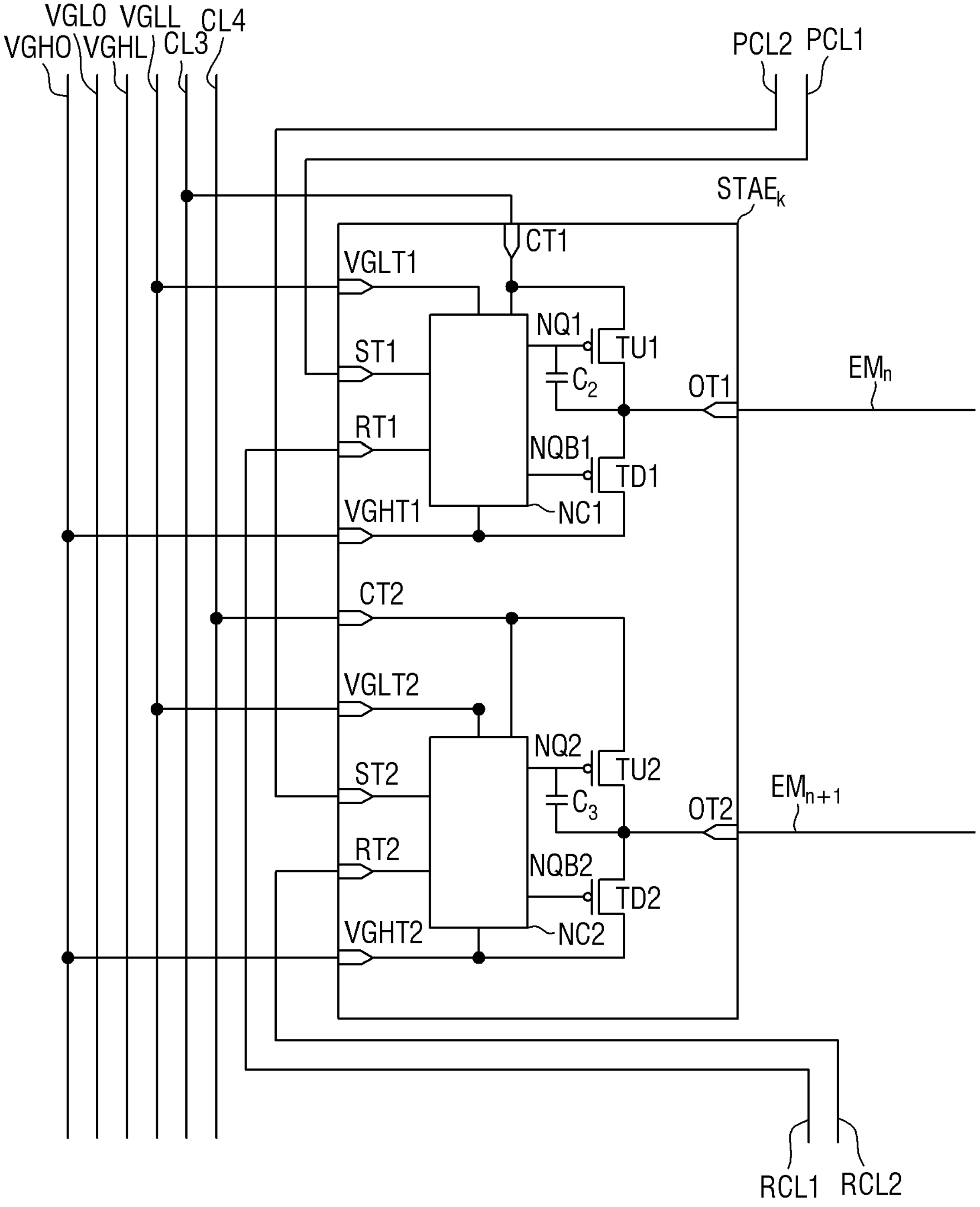
FIG. 5 is a schematic block diagram according to an example of a stage of the emission control driver of FIG. 3.

FIG. 5 is a schematic block diagram according to an example of a stage of the emission control driver 450 of FIG. 3.

The stage STAE of the emission control driver 450 of FIG. 5 is different from the stage STAW of the second scan driver 420 of FIG. 4 at least in that two node controllers NC1 and NC2 are included, and gate-off voltage terminals VGHT1 and VGHT2 of each of the node controllers NC1 and NC2 are electrically connected to the second high-voltage line VGHO for applying the second high voltage VGH2. Differences from the stage STAW of the second scan driver 420 of FIG. 4 will be mainly described with reference to FIG. 6.

The number of stages STAE of the emission control driver 450 may be smaller than the number of emission lines EM. The number of stages STAE of the emission control driver 450 may be ½ of the number of emission lines EM.

The stages STAE of the emission control driver 450 may sequentially output two emission signals. For example, the $k^{th}$ (k is a positive integer) stage STAEk of the emission control driver 450 may be electrically connected to the emission line EMn electrically connected to each of the sub-pixels SP in the $n^{th}$ row and an emission line EMn+1 electrically connected to each of the sub-pixels SP of the $(n+1)^{th}$ row and may output emission signals. For example, in case that a first output terminal OT1 of the $k^{th}$ stage STAEk is electrically connected to the $n^{th}$ emission line EMn, and a second output terminal OT2 is electrically connected to the $(n+1)^{th}$ emission line EMn+1, the first output terminal OT1 of a $(k+1)^{th}$ stage STAEk+1 may be electrically connected to an $(n+2)^{th}$ emission line EMn+2, and the second output terminal OT2 may be electrically connected to an $(n+3)^{th}$ emission line EMn+3.

The first node controller NC1 and the second node controller NC2 of each of the stages STAE of the emission control driver 450 differ only in that each of the gate-off voltage terminals VGHT1 and VGHT2 is electrically connected to the second high-voltage line VGHO for applying the second high voltage VGH2, and may be substantially the same as the node controller NC of the stage STAW of the second scan driver 420 of FIG. 4.

In this way, as a first gate-on voltage terminal VGLT1 of the first node controller NC1 of each of the stages STAE of the emission control driver 450 is electrically connected to the first low-voltage line VGLL, the first gate-off voltage terminal VGHT1 is electrically connected to the second high-voltage line VGHO, a second gate-on voltage terminal VGLT2 of the second node controller NC2 is electrically connected to the first low-voltage line VGLL, and the second gate-off voltage terminal VGHT2 is electrically connected to the second high-voltage line VGHO, it may be advantageous in reducing the occurrence of voltage fluctuations in the emission signal of the emission line EM due to the data signal of the data line DL by using the first low voltage VGL1 of the first low-voltage line VGLL and the second high voltage VGH2 of the second high-voltage line VGHO in case that the emission control driver 450 generates an emission signal that is outputted to the emission line EM.

FIG. 5 illustrates that each of the stages STAE of the emission control driver 450 includes two node controllers NC1 and NC2, but embodiments are not limited thereto. For example, each of the stages STAE of the emission control driver 450 may include a node controller NC, and include two pull-up nodes NQ (e.g., NQ1 and NQ2), two pull-down nodes NQB, two pull-up transistors TU (e.g., TU1 and TU2), two pull-down transistors TD (e.g., TD1 and TD2), and two output terminals OT, or may include only a node controller NC, a pull-up node NQ, a pull-down node NQB (e.g., NQB1 and NQB2), a pull-up transistor TU, and a pull-down transistor TD, but include two output terminals OT. The stages STAE may include capacitors C2 and C3. In this case, the detailed circuit configuration of the node controller NC may be different from the detailed circuit configuration of the node controllers NC1 and NC2 of each of the stages STAE of the emission control driver 450 of FIG. 6. The detailed circuit configuration may include a number and connection relationship of the thin-film transistors of each of the node controllers, a number of clock terminals CT (e.g., CT1) electrically connected to clock lines (e.g., CL3 and CL4), a number of start terminals ST and reset terminals RT, and the like.

FIG. 5 illustrates that each of the stages STAE of the emission control driver 450 is electrically connected to two emission lines EM, but each of the stages STAE of the emission control driver 450 may be electrically connected to an emission line EM or three or more emission lines EM.

Figure 6:
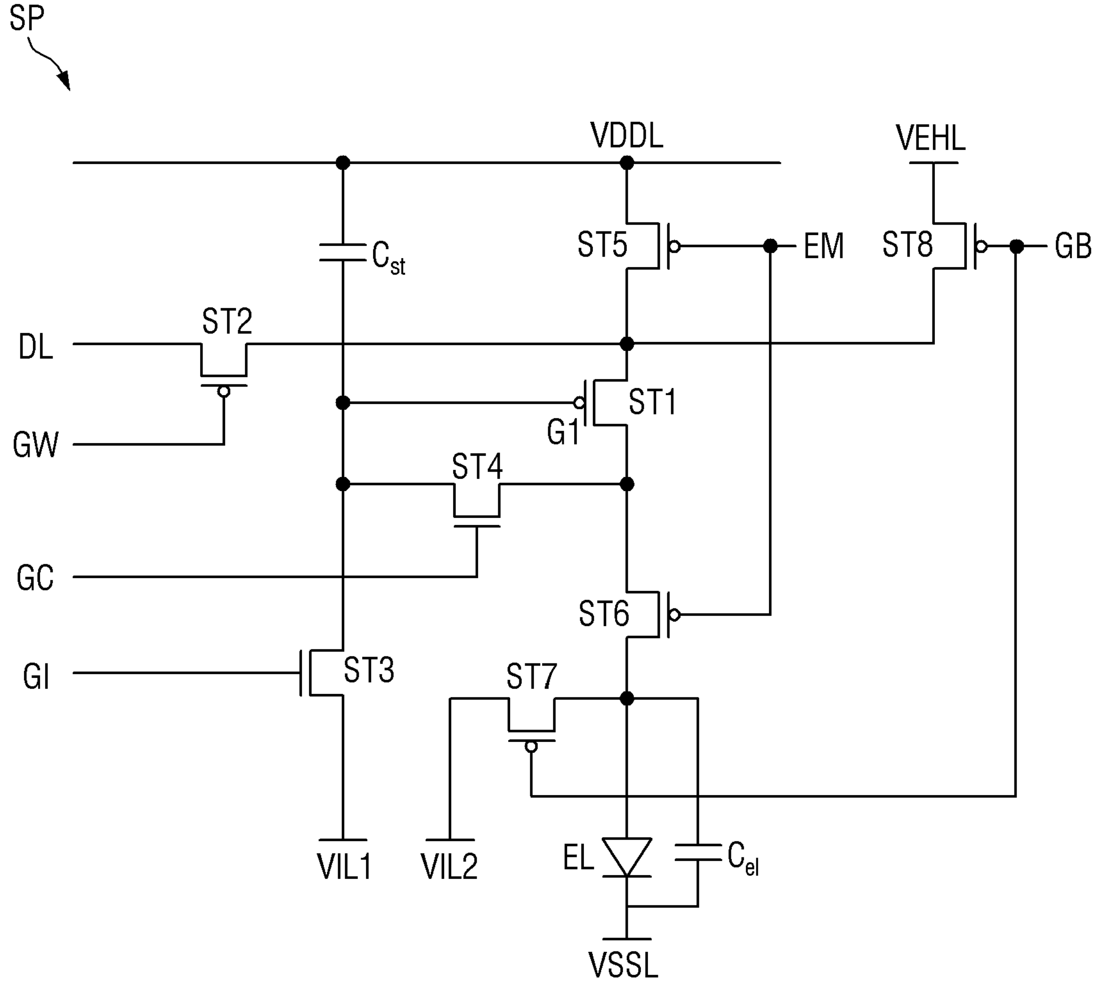
FIG. 6 is a schematic circuit diagram according to an example of the sub-pixel of FIG. 3.

On the other hand, the stages of each of the first scan driver 410 and the third scan driver 430 differ only in that the gate-on voltage terminal of the node controller is electrically connected to the second high-voltage line VGHO and the gate-off voltage terminal is electrically connected to the second low-voltage line VGLO, and may be substantially the same as the stages of the emission control driver 450 of FIG. 6.

The stages of the fourth scan driver 440 differ only in that the gate-off voltage terminal of the node controller is electrically connected to the first high-voltage line VGHL, and may be substantially the same as the stages of the emission control driver 450 of FIG. 6.

FIG. 6 is a schematic circuit diagram according to an example of the sub-pixel SP.

Each of the sub-pixels SP may be electrically connected to the first scan line GI, the second scan line GW, a third scan line GC, a fourth scan line GB, the emission line EM, and the data line DL. Each of the sub-pixels SP may be electrically connected to the first driving voltage line VDDL supplied with a first driving voltage, the second driving voltage line VSSL supplied with a second driving voltage, the bias voltage line VEHL supplied with a bias voltage, a first initialization voltage line VIL1 supplied with a first initialization voltage Vint1 (see FIG. 8), and a second initialization voltage line VIL2 supplied with a second initialization voltage Vint2 (see FIG. 10).

Each of the sub-pixels SP may include first to eighth transistors ST1 to ST8, a light emitting element EL, and at least one capacitor. Among the first to eighth transistors ST1 to ST8, the first transistor ST1 may be a driving transistor, and the second to eighth transistors ST2 to ST8 may be transistors that function as switch elements that are turned on or off according to a scan signal applied to each of the gate electrodes.

The first transistor ST1 may include a gate electrode, a first electrode, and a second electrode. The gate electrode may be a gate electrode disposed on an active layer of the first transistor ST1.

The first transistor ST1 may control a source-drain current Isd (hereinafter referred to as "driving current") according to the data voltage applied to the gate electrode. The driving current Isd flowing through the channel of the first transistor ST1 is proportional to the square of the difference between the voltage between the source electrode and the gate electrode of the first transistor ST1 and the absolute value of a threshold voltage Vth, as shown in Equation 1.

$$Isd = k' \times (Vsg - |Vth|)^2 \tag{1}$$

In Equation 1, k' represents a proportionality coefficient determined by the structure and physical characteristics of the first transistor ST1, Vsg represents the source-gate voltage of the first transistor ST1, and Vth represents the threshold voltage of the first transistor ST1.

The light emitting element EL may emit light by the driving current Isd. The amount of light emitted from the light emitting element EL may be proportional to the magnitude of the driving current Isd.

The light emitting element EL may be an organic light emitting diode including an anode electrode, a cathode electrode, and an organic light emitting layer disposed between the anode electrode and the cathode electrode. As another example, the light emitting element EL may be an inorganic light emitting diode including an anode electrode, a cathode electrode, and an inorganic light emitting layer disposed between the anode electrode and the cathode electrode. As another example, the light emitting element EL may be a quantum dot light emitting element including an anode electrode, a cathode electrode, and a quantum dot light emitting layer disposed between the anode electrode and the cathode electrode. As another example, the light emitting element EL may be a micro light emitting diode.

The anode electrode of the light emitting element EL may be electrically connected to a second electrode of the sixth transistor ST6 and a second electrode of the seventh transistor ST7, and the cathode electrode may be electrically connected to the second driving voltage line VSSL. A parasitic capacitance Cel may be formed between the anode electrode and the cathode electrode of the light emitting element EL.

The second transistor ST2 may be disposed between the data line DL and the first electrode of the first transistor ST1. The second transistor ST2 may be turned on by the scan signal of the second scan line GW to electrically connect the first electrode of the first transistor ST1 to the data line DL. A gate electrode of the second transistor ST2 may be electrically connected to the second scan line GW, a first electrode thereof may be electrically connected to the data line DL, and a second electrode thereof may be electrically connected to the first electrode of the first transistor ST1.

The third transistor ST3 may be disposed between the first initialization voltage line VIL1 and the gate electrode of the first transistor ST1. The third transistor ST3 may be turned on by the scan signal of the first scan line GI to electrically connect the gate electrode of the first transistor ST1 to the first initialization voltage line VIL1. In this case, the gate electrode of the first transistor ST1 may be discharged to the first initialization voltage Vint1 of the first initialization voltage line VIL1. A gate electrode of the third transistor ST3 may be electrically connected to the first scan line GI, a first electrode thereof may be electrically connected to the gate electrode of the first transistor ST1, and a second electrode thereof may be electrically connected to the first initialization voltage line VIL1.

The fourth transistor ST4 may be disposed between the gate electrode of the first transistor ST1 and the second electrode of the first transistor ST1. The fourth transistor ST4 may be turned on by the scan signal of the third scan line GC to electrically connect the gate electrode of the first transistor ST1 to the second electrode. For example, in case that the fourth transistor ST4 is turned on, since the gate electrode of the first transistor ST1 and the second electrode thereof are electrically connected, the first transistor ST1 may be driven as a diode. A gate electrode of the fourth transistor ST4 may be electrically connected to the third scan line GC, a first electrode thereof may be electrically connected to the gate electrode of the first transistor ST1, and a second electrode thereof may be electrically connected to the second electrode of the first transistor ST1.

The fifth transistor ST5 may be disposed between the first driving voltage line VDDL and the first electrode of the first transistor ST1. The fifth transistor ST5 may be turned on by the emission signal of the emission line EM to electrically connect the first electrode of the first transistor ST1 to the first driving voltage line VDDL. A gate electrode of the fifth transistor ST5 may be electrically connected to the emission line EM, a first electrode thereof may be electrically connected to the first driving voltage line VDDL, and a second electrode thereof may be electrically connected to the first electrode of the first transistor ST1.

The sixth transistor ST6 may be disposed between the second electrode of the first transistor ST1 and the anode electrode of the light emitting element EL. The sixth transistor ST6 may be turned on by the emission signal of the emission line EM to electrically connect the second electrode of the first transistor ST1 to the anode electrode of the light emitting element EL. The gate electrode of the sixth transistor ST6 may be electrically connected to the emission line EM, a first electrode thereof may be electrically connected to the second electrode of the first transistor ST1, and the second electrode thereof may be electrically connected to the anode electrode of the light emitting element EL.

In case that both the fifth transistor ST5 and the sixth transistor ST6 are turned on, the driving current Isd may be supplied to the light emitting element EL.

The seventh transistor ST7 may be disposed between the second initialization voltage line VIL2 and the anode electrode of the light emitting element EL. The seventh transistor ST7 may be turned on by the scan signal of the fourth scan line GB to electrically connect the second initialization voltage line VIL2 to the anode electrode of the light emitting element EL. In this case, the anode electrode of the light emitting element EL may be discharged with the second initialization voltage Vint2. A gate electrode of the seventh transistor ST7 may be electrically connected to the fourth scan line GB, a first electrode thereof may be electrically connected to the second initialization voltage line VIL2, and the second electrode thereof may be electrically connected to the anode electrode of the light emitting element EL.

The eighth transistor ST8 may be disposed between the bias voltage line VEHL and the first electrode of the first transistor ST1. The eighth transistor ST8 may be turned on by the scan signal of the fourth scan line GB to electrically connect the bias voltage line VEHL to the first electrode of the first transistor ST1. A gate electrode of the eighth transistor ST8 may be electrically connected to the fourth scan line GB, a first electrode thereof may be electrically connected to the bias voltage line VEHL, and a second electrode thereof may be electrically connected to the first electrode of the first transistor ST1.

The storage capacitor Cst may be formed between the gate electrode of the first transistor ST1 and the first driving voltage line VDDL. An electrode of the storage capacitor Cst may be electrically connected to the gate electrode of the first transistor ST1, and another electrode thereof may be electrically connected to the first driving voltage line VDDL. Accordingly, the storage capacitor Cst may maintain a potential difference between the gate electrode of the first transistor ST1 and the first driving voltage line VDDL.

In case that the first electrode of each of the first to eighth transistors ST1 to ST8 is a source electrode, the second electrode may be a drain electrode. As another example, in case that the first electrode of each of the first to eighth transistors ST1 to ST8 is a drain electrode, the second electrode may be a source electrode.

The active layer of each of the first to eighth transistors ST1 to ST8 may be formed of any of polysilicon, amorphous silicon, and an oxide semiconductor.

According to an embodiment, the first transistor ST1, the second transistor ST2, and the fifth to eighth transistors ST5, ST6, ST7, and ST8 may be P-channel transistors, and the third transistor ST3 and the fourth transistor ST4 may be N-channel transistors. In this case, the active layer of each of the first transistor ST1, the second transistor ST2, and the fifth to eighth transistors ST5, ST6, ST7, and ST8 formed of P-channel transistors may be formed of polysilicon, and the active layer of each of the third transistor ST3 and the fourth transistor ST4 formed of N-channel transistors may be formed of an oxide. In this way, the active layer of each of the third transistor ST3 and the fourth transistor ST4 electrically connected to the gate electrode of the first transistor ST1 may be formed as N-channel transistors, which are oxides, so that it may be advantageous in decreasing a leakage current and reducing power consumption.

Figure 7:
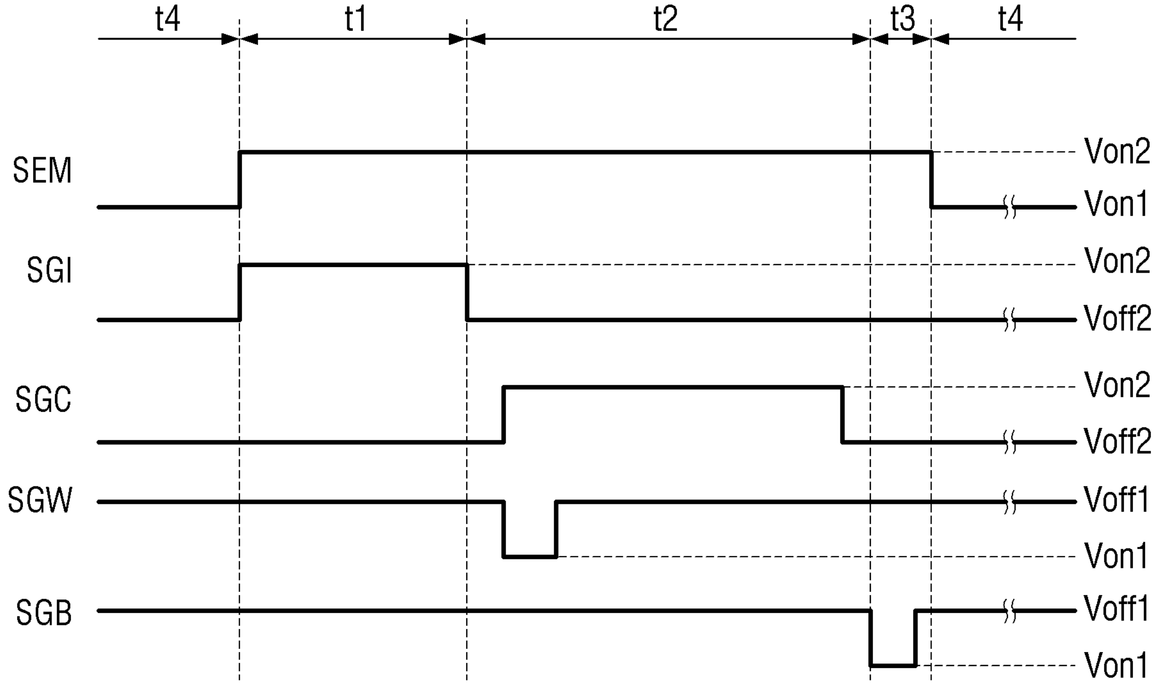
FIG. 7 is a waveform diagram of signals applied to each of a first scan line, a second scan line, a third scan line, a fourth scan line, and an emission line connected to the sub-pixel of FIG. 6.

FIG. 7 is a waveform diagram of signals applied to each of a first scan line, a second scan line, a third scan line, a fourth scan line, and an emission line electrically connected to the sub-pixel of FIG. 6.

Referring to FIGS. 6 and 7, a first scan signal SGI is a signal applied to the first scan line GI and is a signal for controlling turn-on and turn-off of the third transistor ST3. A second scan signal SGW is a signal applied to the second scan line GW and is a signal for controlling turn-on and turn-off of the second transistor ST2. A third scan signal SGC is a signal applied to the third scan line GC and is a signal for controlling turn-on and turn-off of the fourth transistor ST4. A fourth scan signal SGB is a signal applied to the fourth scan line GB and is a signal for controlling turn-on and turn-off of each of the seventh transistor ST7 and the eighth transistor ST8.

An emission signal SEM is a signal applied to the emission line EM and is a signal for controlling turn-on and turn-off of each of the fifth transistor ST5 and the sixth transistor ST6. In the case of the emission signal SEM, the emission control driver 450 uses the first low-voltage line VGLL electrically connected to the second scan driver 420 and the second high-voltage line VGHO electrically connected to the first scan driver 410 in generating the emission signal SEM for controlling the fifth transistor ST5 and the sixth transistor ST6, and thus the emission signal SEM may have the first gate-on voltage Von1 that is the first low voltage VGL1, and the second gate-on voltage Von2 that is the second high voltage VGH2. Accordingly, in case that the emission signal SEM has the first gate-on voltage Von1 that is the first low voltage VGL1, each of the fifth transistor ST5 and the sixth transistor ST6 is turned on, and in case that the emission signal SEM has the second gate-on voltage Von2 that is the second high voltage VGH2, each of the fifth transistor ST5 and the sixth transistor ST6 is turned off.

The first to fourth scan signals SGI, SGW, SGC, and SGB and the emission signal SEM may be generated at a cycle of a frame period. A frame period may be divided into a first period t1, a second period t2, a third period t3, and a fourth period t4.

The first period t1 is a period in which the voltage of the gate electrode of the first transistor ST1 is initialized to the first initialization voltage Vint1 by applying the first initialization voltage Vint1 to the gate electrode of the first transistor ST1.

The second period t2 is a period in which the data voltage is supplied to the first electrode of the first transistor ST1 and the threshold voltage Vth of the first transistor ST1 is sampled.

The third period t3 is a period in which the voltage of the anode electrode of the light emitting element EL is initialized to the second initialization voltage Vint2 by applying the second initialization voltage Vint2 to the anode electrode of the light emitting element EL. In case that the driving frequency changes, it may be a period in which a bias voltage is applied to the first electrode of the first transistor ST1 to artificially set the bias voltage of the first transistor ST1.

The fourth period t4 is a period in which the driving current Isd flowing according to the voltage of the gate electrode of the first transistor ST1 is supplied to the light emitting element EL and the light emitting element EL emits light.

The first scan signal SGI may have the second gate-on voltage Von2 during the first period t1 and may have the second gate-off voltage Voff2 during the remaining periods t2, t3, and t4. The second scan signal SGW may have the first gate-on voltage Von1 in the second period t2 and may have the first gate-off voltage Voff1 during the remaining periods t1, t3, and t4. The third scan signal SGC may have the second gate-on voltage Von2 in the second period t2 and may have the second gate-off voltage Voff2 during the remaining periods t1, t3, and t4. The fourth scan signal SGB may have the first gate-on voltage Von1 in the third period t3 and may have the first gate-off voltage Voff1 during the remaining periods t1, t2, and t4.

The emission signal SEM may have the first gate-on voltage Von1 in the fourth period t4 and may have the second gate-on voltage Von2 during the remaining periods t1, t2, and t3. However, the disclosure is not limited thereto. For example, the fourth period t4 may also include first sub-periods in which the emission signal SEM has the second gate-on voltage Von2 and second sub-periods in which the emission signal SEM has the first gate-on voltage Von1. In this case, the first sub-periods and the second sub-periods may be alternately disposed.

FIG. 7 illustrates that a period in which the first scan signal SGI has the second gate-on voltage Von2 is substantially the same as the first period t1, but the period in which the first scan signal SGI has the second gate-on voltage Von2 may be shorter than the first period t1.

FIG. 7 illustrates that a period in which the second scan signal SGW has the first gate-on voltage Von1 is shorter than the second period t2 and a period in which the fourth scan signal SGB has the first gate-on voltage Von1 is shorter than the third period t3, but the period in which the second scan signal SGW has the first gate-on voltage Von1 may be substantially the same as the second period t2, and the period in which the fourth scan signal SGB has the first gate-on voltage Von1 may be substantially the same as the third period t3.

A period in which a third scan signal SGC has the second gate-on voltage Von2 may be shorter than the second period t2 as illustrated in FIG. 7, but the disclosure is not limited thereto. For example, a period in which the third scan signal SGC has the second gate-on voltage Von2 may be substantially the same as the second period t2, and the period in which the third scan signal SGC has the second gate-on voltage Von2 may at least partially overlap the period in which the first scan signal SGI has the second gate-on voltage Von2, and may have the second gate-on voltage Von2 in the first period t1.

FIG. 7 illustrates that each of the first period t1 and the second period t2 is a horizontal period. A horizontal period indicates a period in which the data voltage is supplied to each of the sub-pixels SP electrically connected to any scan line of the display panel 100, and thus may be defined as a horizontal line scan period. The data voltages may be supplied to the data lines DL in synchronization with the gate-on voltage of each of the scan signals.

FIGS. 8 to 11 are schematic circuit diagrams illustrating a method of driving the sub-pixel of FIG. 6 during the first to fourth periods of FIG. 7.

Figure 8:
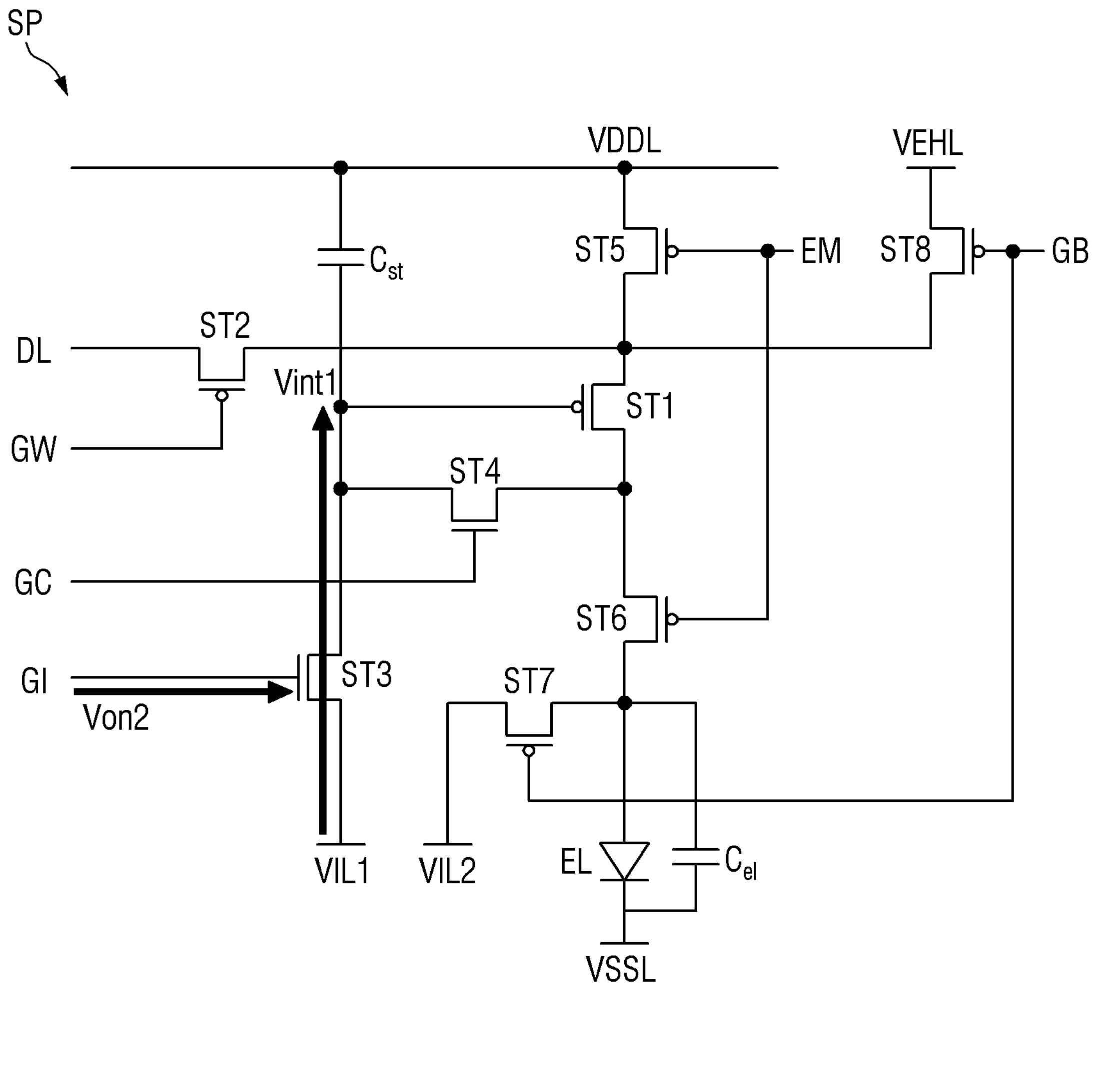
FIGS. 8 to 11 are schematic circuit diagrams illustrating a method of driving the sub-pixel of FIG. 6 during the first to fourth periods of FIG. 7.

First, during the first period t1, the first scan signal SGI having the second gate-on voltage Von2 is supplied to the first scan line GI. During the first period t1, as illustrated in FIG. 8, the third transistor ST3 is turned on by the first scan signal SGI. Because of the turn-on of the third transistor ST3, the gate electrode of the first transistor ST1 is initialized to the first initialization voltage Vint1 of the first initialization voltage line VIL1.

Second, during the second period t2, the second scan signal SGW having the first gate-on voltage Von1 is supplied to the second scan line GW. Accordingly, the second transistor ST2 electrically connected to the second scan line GW is turned on to supply a data voltage Vdata to the first electrode of the first transistor ST1. During the second period t2, the third scan signal SGC having the second gate-on voltage Von2 is supplied to the third scan line GC, so that the fourth transistor ST4 is turned on. Because of the turn-on of the fourth transistor ST4, the gate electrode and the second electrode of the first transistor ST1 are electrically connected, and the first transistor ST1 is driven as a diode.

At this time, since the voltage (Vsg=Vdata−Vint1) between the first electrode and the gate electrode of the first transistor ST1 is less than the absolute value of the threshold voltage Vth, the first transistor ST1 forms a current path until the voltage Vsg between the gate electrode and the source electrode reaches the absolute value of the threshold voltage Vth. Accordingly, the voltage of the gate electrode and the second electrode of the first transistor ST1 rises up to the difference voltage (Vdata−|Vth|) between the data voltage Vdata and the absolute value of the threshold voltage Vth of the first transistor ST1 during the second period t2. The difference voltage (Vdata−|Vth|) may be stored in the storage capacitor Cst.

Since the first transistor ST1 is formed of the P-channel transistor, the driving current Isd of the first transistor ST1 may be proportional to a voltage Vsd between the source electrode and the drain electrode of the first transistor ST1 in a section in which the voltage Vsd between the source electrode and the drain electrode of the first transistor ST1 is greater than OV. The threshold voltage Vth of the first transistor ST1 may be less than OV.

Figure 10:
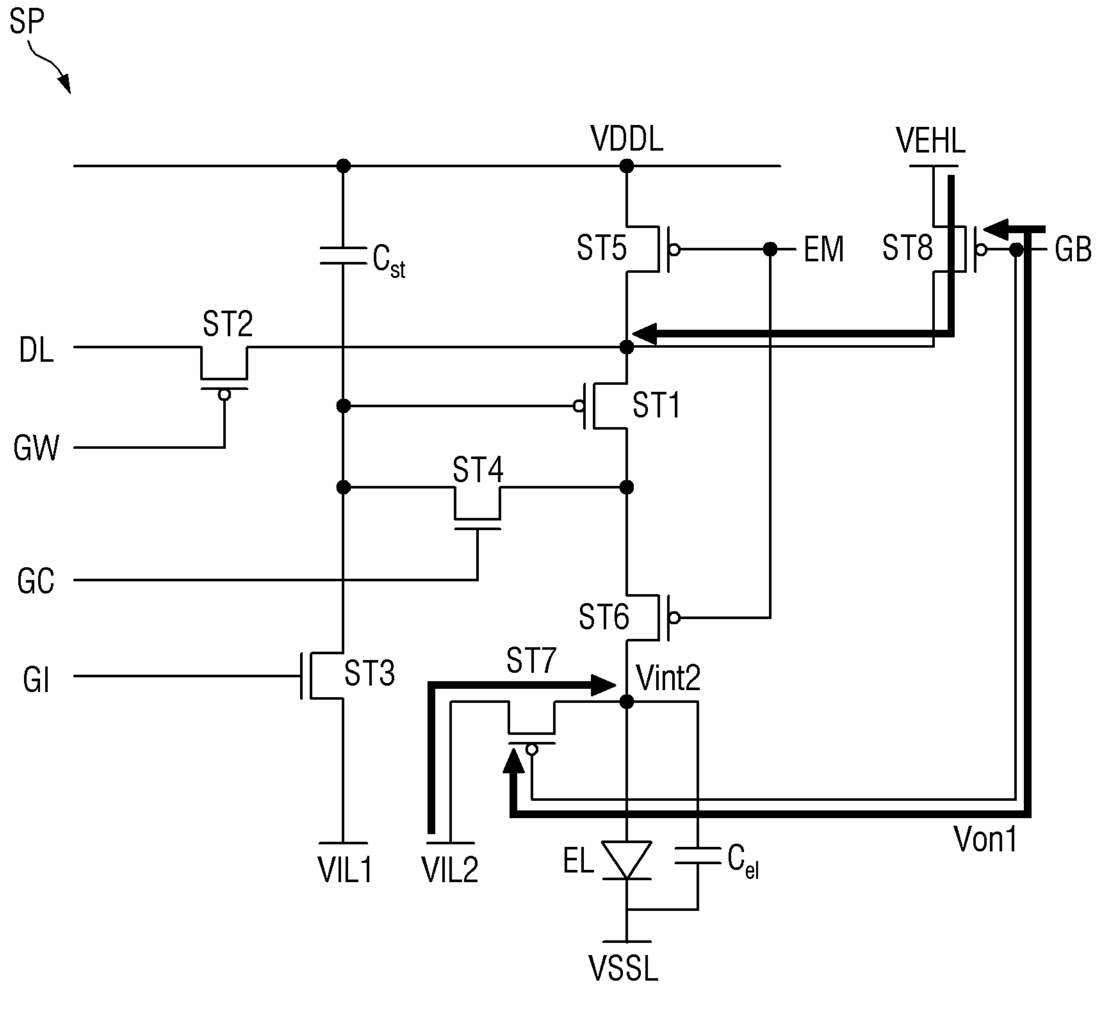

Third, during the third period t3, the fourth scan signal SGB having the first gate-on voltage Von1 is supplied to the fourth scan line GB. During the third period t3, as illustrated in FIG. 10, the seventh transistor ST7 is turned on by the fourth scan signal SGB, so that the anode electrode of the light emitting element EL is initialized to the second initialization voltage Vint2 of the second initialization voltage line VIL2.

The eighth transistor ST8 may be turned on by the fourth scan signal SGB to supply a bias voltage to the first electrode of the first transistor ST1. Accordingly, an operating point of the first transistor ST1 may be set in advance. For example, since the magnitude of the driving current Isd for the light emitting element EL to emit light may be different according to the frequency, in case that the frequency is changed, by applying a bias voltage, which is higher than the first driving voltage, to the first electrode of the first transistor ST1 in advance to set an operating point, it may be advantageous in reducing a phenomenon in which the light emitting element EL flickers according to a frequency change.

Figure 11:
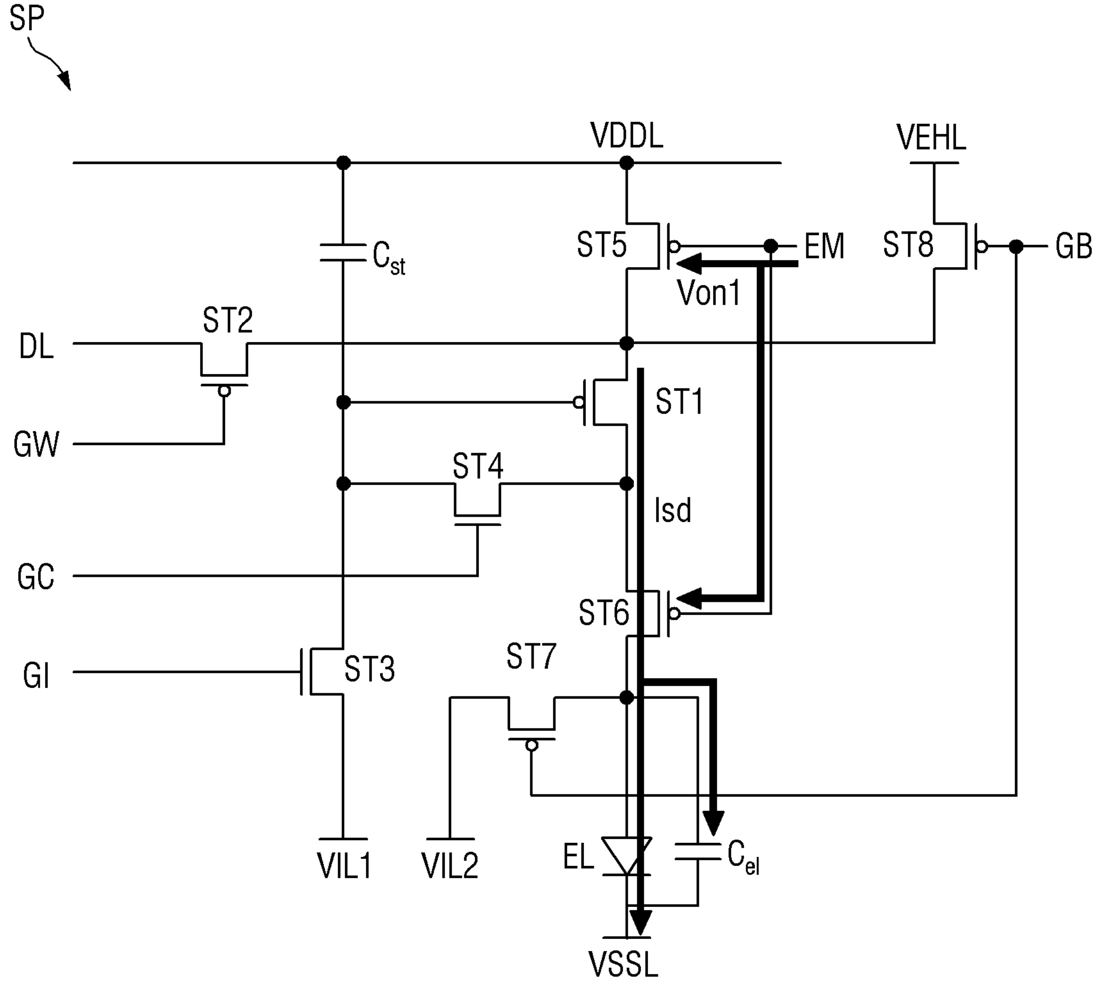

Fourth, during the fourth period t4, the emission signal SEM having the first gate-on voltage Von1 is supplied to the emission line EM. During the fourth period t4, as illustrated in FIG. 11, each of the fifth transistor ST5 and the sixth transistor ST6 is turned on by the emission signal SEM.

The first electrode of the first transistor ST1 is electrically connected to the first driving voltage line VDDL because of the turn-on of the fifth transistor ST5, and the second electrode of the first transistor ST1 is electrically connected to the anode electrode of the light emitting element EL because of the turn-on of the sixth transistor ST6.

In case that the fifth transistor ST5 and the sixth transistor ST6 are turned on, the driving current Isd flowing according to the voltage of the gate electrode of the first transistor ST1 may be supplied to the light emitting element EL. The driving current Isd may be defined as in Equation 2.

$$Isd=K'\times(\text{ELVDD}-(V\text{data}-|V\text{th}|)-|V\text{th}|)^2 \quad (2)$$

In Equation 2, k' represents a proportional coefficient determined by the structure and physical characteristics of the first transistor ST1, Vth represents the threshold voltage of the first transistor ST1, ELVDD represents the first driving voltage of the first driving voltage line VDDL, and "Vdata" represents the data voltage. The gate voltage of the first transistor ST1 is "Vdata−|Vth|," and the voltage of the first electrode is "ELVDD." When Equation 2 is summarized, Equation 3 is derived.

$$Isd=K'\times(\text{ELVDD}-V\text{data})^2 \quad (3)$$

Consequently, as illustrated in Equation 3, the driving current Isd does not depend on the threshold voltage Vth of the first transistor ST1. For example, the threshold voltage Vth of the first transistor ST1 that is the driving transistor is compensated for.

Figure 12:
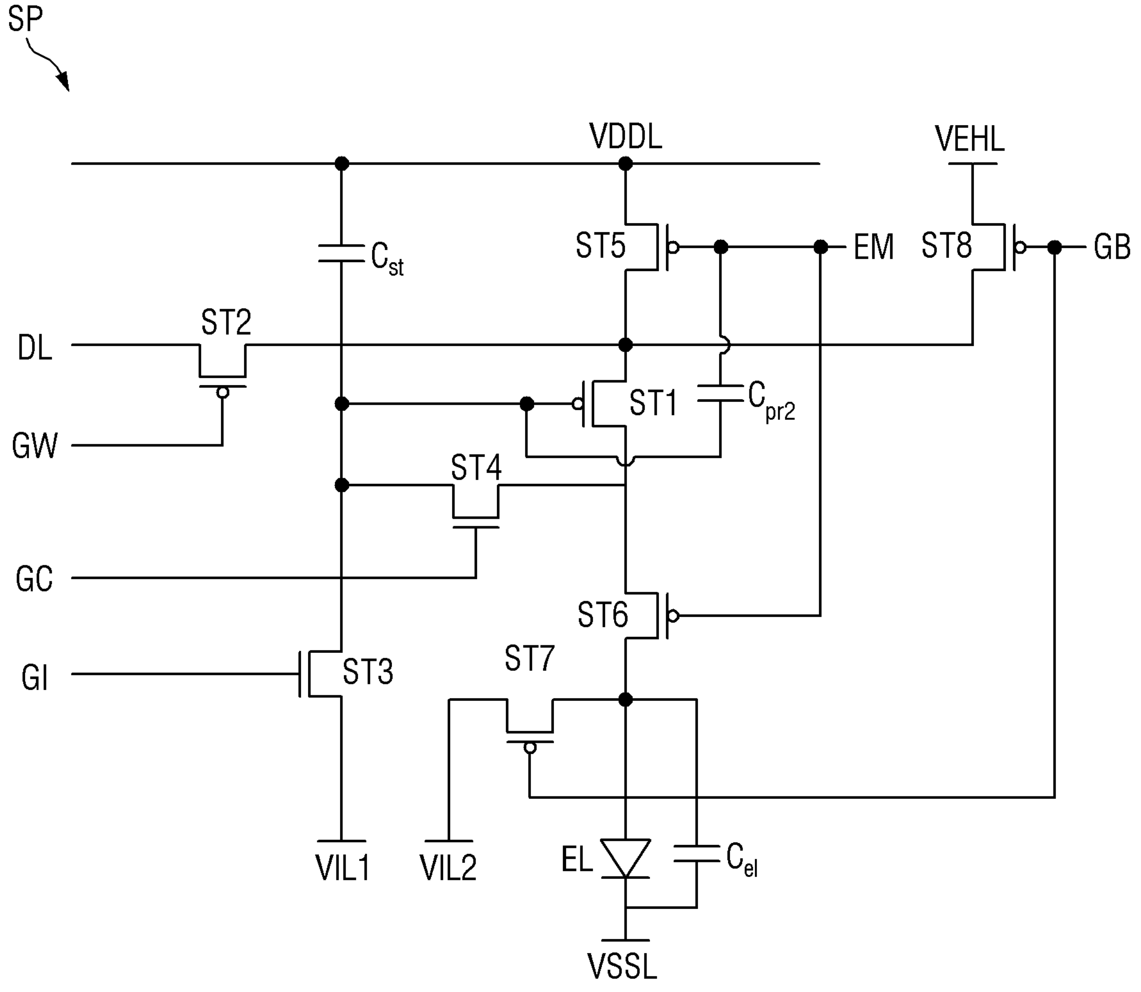
FIG. 12 is a schematic circuit diagram illustrating a second parasitic capacitor formed between an emission line of a sub-pixel and a gate electrode of a first transistor.
Figure 13:
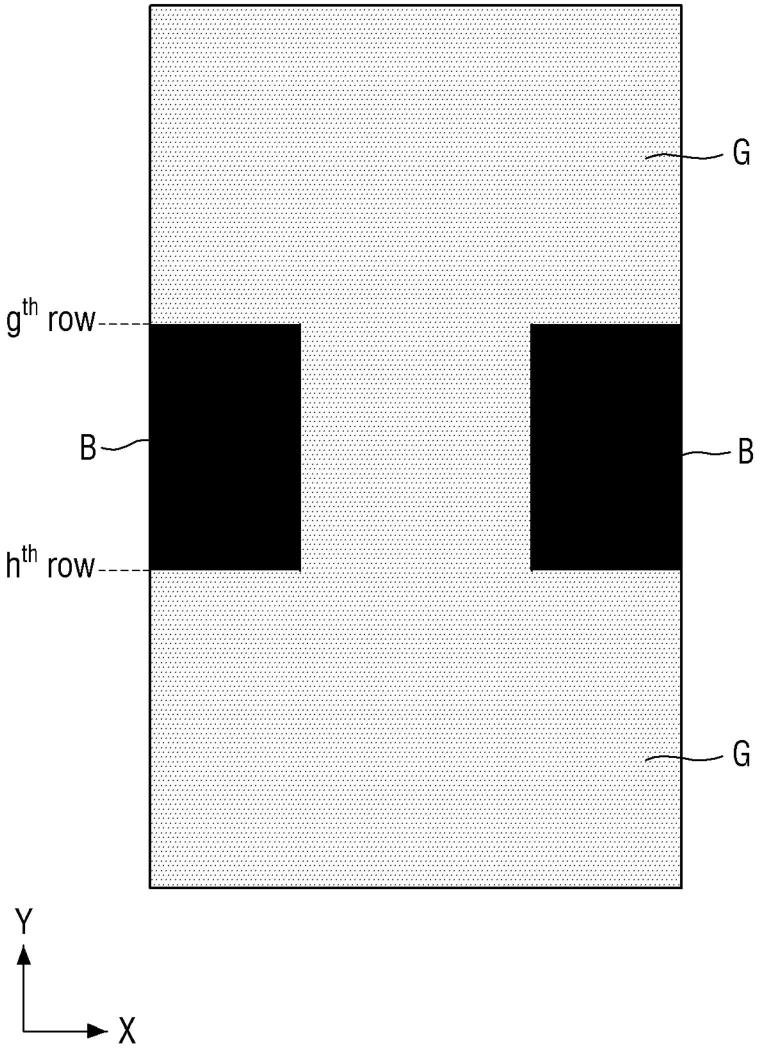
FIG. 13 is a schematic view illustrating a test screen for checking whether horizontal crosstalk is generated according to a voltage change of a gate electrode of a first transistor.
Figure 14:
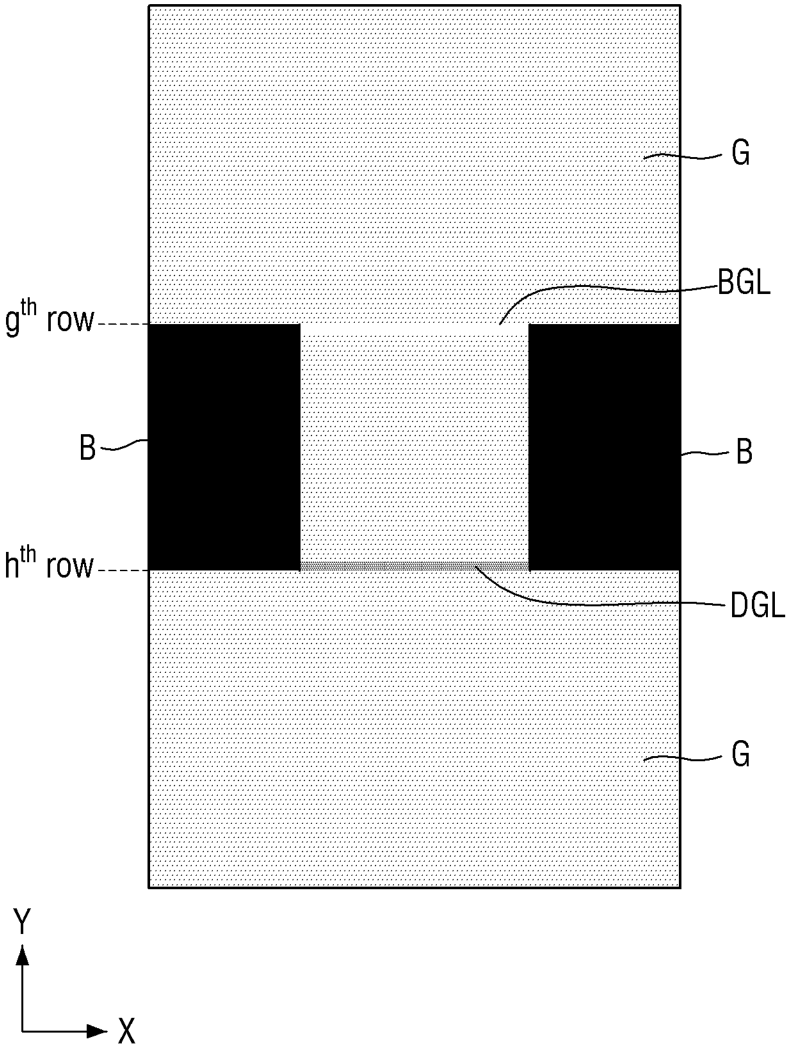
FIG. 14 is a schematic diagram illustrating horizontal crosstalk generated according to a voltage change of a gate electrode of a first transistor.
Figure 15:
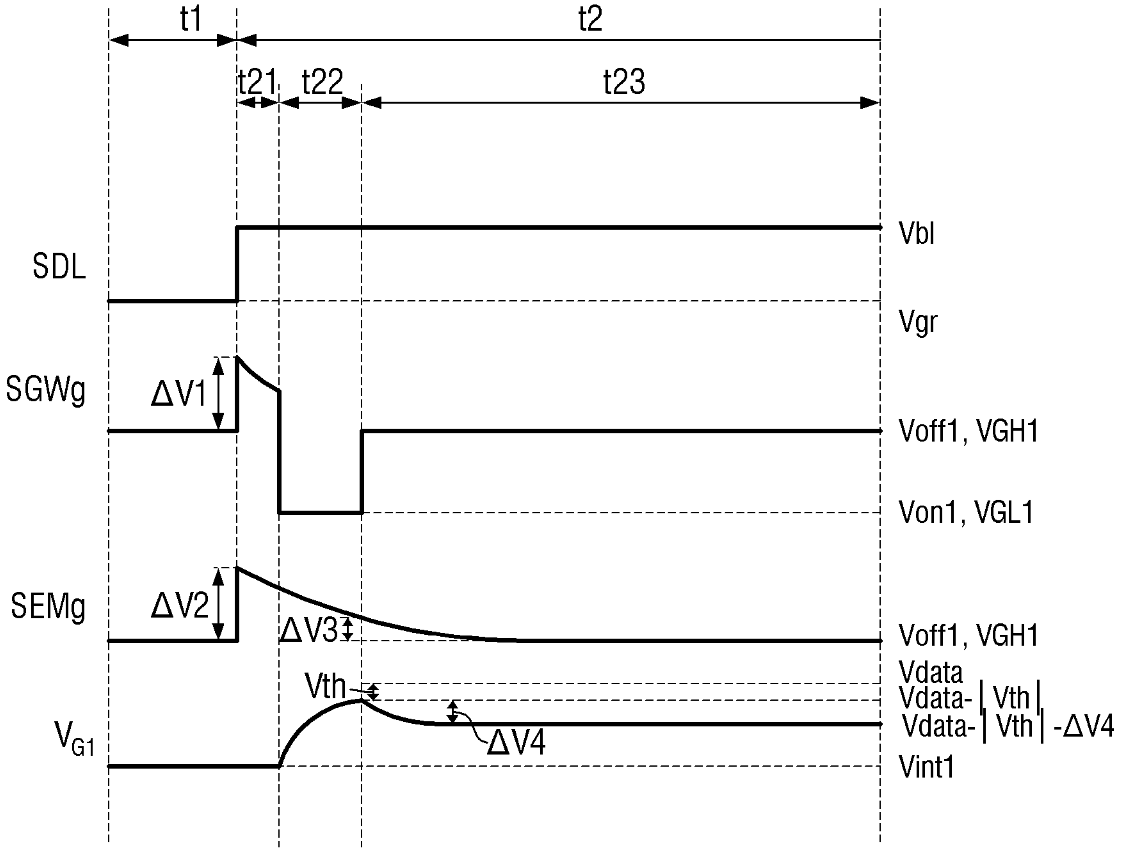
FIG. 15 is a timing diagram illustrating an example of a voltage change of a gate electrode of a first transistor that may be generated by a second parasitic capacitor.

FIG. 12 is a schematic circuit diagram illustrating a second parasitic capacitor formed between an emission line of a sub-pixel and a gate electrode of a first transistor. FIG. 13 is a schematic view illustrating a test screen for checking whether horizontal crosstalk is generated according to a voltage change of a gate electrode of a first transistor. FIG. 14 is a schematic diagram illustrating horizontal crosstalk generated according to a voltage change of a gate electrode of a first transistor. FIG. 15 is a timing diagram illustrating an example of a voltage change of a gate electrode of a first transistor that may be generated by a second parasitic capacitor.

A second parasitic capacitor Cpr2 may be formed between the gate electrode of the first transistor ST1 of the sub-pixel SP and the emission line EM as illustrated in FIG. 12. Accordingly, in case that the voltage of the emission line EM changes, the voltage of the gate electrode of the first transistor ST1 may be affected.

For simplicity of description, FIG. 15 illustrates only a part of the first period t1 and the second period t2 among the first to fourth periods t1 to t4 of FIG. 8 are illustrated.

Referring to FIG. 15, the second period t2 may include a first sub-period t21 in which the data signal SDL is changed, a second sub-period t22 in which the second scan line GW has the first gate-on voltage Von1, and a third sub-period t23 in which a second scan signal SGWg has the first gate-off signal Voff1.

In FIG. 15, SGWg indicates a second scan signal applied to the second scan line GW disposed in the $g^{th}$ row, and SEMg indicates an emission signal applied to the emission line EM disposed in the $g^{th}$ row. In addition, $V_{G1}$ indicates the voltage of the gate electrode G1 of the first transistor ST1.

Hereinafter, a voltage change of the gate electrode of the first transistor ST1, which may occur in case that the first high-voltage line VGHL is electrically connected to the emission control driver 450 instead of the second high-voltage line VGHO as shown in FIG. 3, and the emission control driver 450, the second scan driver 420, and the fourth scan driver 440 share the first high-voltage line VGHL, will be described in detail.

First, in case that the data voltage of the data line DL increases in the first sub-period t21, the voltage of the second scan signal SGWg of the second scan line GW may be coupled to the data voltage by the first parasitic capacitor Cpr1 in FIG. 4 formed between the data line DL and the second scan line GW to rise by a first voltage difference ΔV1.

In this case, the emission signal SEMg of the emission line EM that has been outputting the first high voltage VGH1 may also increase by a second voltage difference ΔV2 according to an increase in the potential of the first high-voltage line VGHL. In this case, a period in which the emission signal SEMg of the emission line EM increases by the second voltage difference ΔV2 and then recovers to the first high voltage VGH1 may continue until the second sub-period t22.

Figure 9:
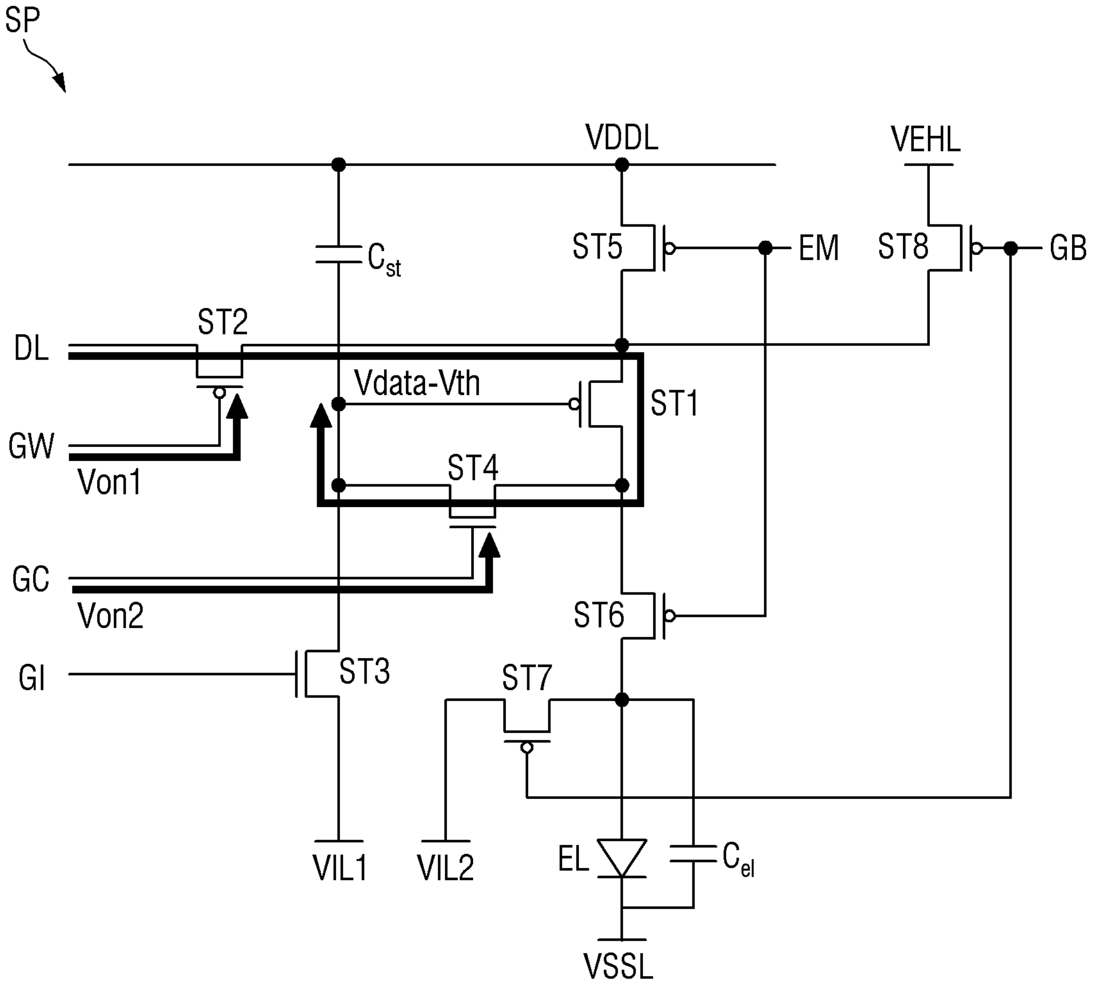

Second, as illustrated in FIG. 9, a data voltage may be applied to the first electrode of the first transistor ST1 during the second sub-period t22 in which the second scan signal SGWg has the first gate-on voltage Von1, and the second electrode of the first transistor ST1 and the gate electrode thereof may be electrically connected so that the threshold voltage Vth of the first transistor ST1 may be compensated for.

Third, in case that the second transistor ST2 is turned off by the second scan signal SGWg in the third sub-period t23, the voltage of the gate electrode of the first transistor ST1 may be coupled to the emission signal SEMg of the emission line EM by the second parasitic capacitor Cpr2 between the emission line EM and the gate electrode of the first transistor ST1.

Specifically, in case that the threshold voltage Vth of the first transistor ST1 is compensated for and the emission signal SEMg is not restored to the first high voltage VGH1 at a time point at which the second transistor ST2 is turned off, a voltage fluctuation ΔV3 of the emission signal SEMg during the third sub-period t23 may be reflected on a gate electrode G1 of the first transistor ST1 by the second parasitic capacitor Cpr2. In this case, the voltage of the gate electrode G1 of the first transistor ST1 may be lowered by a fourth voltage difference ΔV4. For example, the voltage of the gate electrode G1 of the first transistor ST1 may be "Vdata−|Vth|−ΔV4."

For example, as illustrated in FIG. 14, in case that a black image B, a gray image G, and the black image B are sequentially displayed in the first direction X in a central area of the display panel 100, and the gray image G is displayed in the remaining areas, since the first transistor ST1 is the P-channel transistor, a data voltage (e.g., a black voltage Vbl) applied to the sub-pixel SP displaying the black image B may be higher than a data voltage (e.g., a gray voltage Vgr) applied to the sub-pixels SP displaying the gray image G.

At the boundary between the gray image G and the black image B ($g^{th}$ row of FIG. 14), the voltage of the data line DL may be changed from the gray voltage Vgr to the black voltage Vbl. In case that the gray voltage Vgr is applied to the gate electrode of the first transistor ST1, the gray voltage Vgr may be a voltage at which the light emitting element EL emits light with gray luminance by the driving current Isd of the first transistor ST1. In case that the black voltage Vbl is applied to the gate electrode of the first transistor T1, the black voltage Vbl may be a voltage at which the light emitting element EL emits light with black luminance by the driving current Isd of the first transistor ST1.

Accordingly, the voltage of the gate electrode of the first transistor ST1 drops by the fourth voltage difference ΔV4, and the driving current Isd increases as illustrated in Equation 4. Accordingly, the sub-pixels SP to display the gray image G may display a gray scale that is relatively brighter than a desired gray scale in response to a voltage drop of the fourth voltage difference ΔV4. Accordingly, horizontal crosstalk may occur in which the user visually recognizes a bright gray line BGL having a luminance difference from adjacent rows in the second direction Y as illustrated in the $g^{th}$ row of FIG. 14.

$$Isd=k'\times(Vdd-V\text{data}+\Delta V4)^2 \tag{4}$$

Similarly, at the boundary ($h^{th}$ row of FIG. 14) between the black image B and the gray image G, the voltage of the data line DL may be changed from the black voltage Vbl to the gray voltage Vgr.

Although the waveform of each of a second scan signal SGWh, the data signal SDL, and an emission signal SEMh that are applied to the $h^{th}$ row of FIG. 14 and the voltage fluctuation of the gate electrode of the first transistor ST1 are not specifically illustrated in the drawings, the magnitude of each of voltage differences ΔV1', ΔV2', ΔV3', and ΔV4' (not shown) mentioned below may be a non-limiting example and may be substantially the same as the magnitude of each of the voltage differences ΔV1, ΔV2, ΔV3, and ΔV4 of FIG. 13.

As the data signal SDL is changed from the black voltage Vbl to the gray voltage Vgr, the second scan signal SGWh in the $h^{th}$ row of FIG. 14 may be dropped by the first voltage difference ΔV1' from the first high voltage VGH1 by the first parasitic capacitor Cpr1, and the emission control signal SEMh of the $h^{th}$ row, which has been outputting the first high voltage VGH1, may be dropped by the second voltage difference ΔV2'.

The emission control signal SEMh in the $h^{th}$ row of FIG. 14 may not recover to the first high voltage VGH1 during the second sub-period t22, and the voltage thereof may fluctuate by the third voltage difference ΔV3' during the third sub-period t23.

During the third sub-period t23, the voltage fluctuation ΔV3' of the emission control signal SEMh is reflected on the gate electrode of the first transistor ST1 by the second parasitic capacitor Cpr2, so that the voltage of the gate electrode of the first transistor ST1 is raised by the fourth voltage difference ΔV4', and the driving current Isd decreases as illustrated in Equation 5.

Accordingly, the sub-pixels SP to display the gray image G may display a gray scale that is relatively darker than a desired gray scale in response to a voltage rise of the fourth voltage difference ΔV4'. Accordingly, horizontal crosstalk may occur in which the user visually recognizes a dark gray line DGL having a luminance difference from adjacent rows in the second direction Y as illustrated in the $h^{th}$ row of FIG. 14.

$$Isd=k'\times(Vdd-V\text{data}-\Delta V4')^2 \tag{5}$$

In summary, in case that the second scan driver 420, the fourth scan driver 440, and an emission driver share the first high-voltage line VGHL, after "Vdata−|Vth|" is sampled at the gate electrode of the first transistor ST1, the voltage change in which the voltage of the emission line EM is restored to the first high voltage VGH1 is reflected on the gate electrode of the first transistor ST1 by the second parasitic capacitor Cpr2, so that the voltage of the gate electrode of the first transistor ST1 may fluctuate without maintaining "Vdata−|Vth|." Accordingly, since the driving current Isd of the first transistor ST1 fluctuates, the light emitting element EL may emit light with a luminance different from the originally intended luminance.

However, according to an embodiment, as illustrated in FIG. 3, the emission control driver 450 shares the second high-voltage line VGHO instead of the first high-voltage line VGHL with the first scan driver 410 and the third scan driver 430. For example, the second scan driver 420 and the fourth scan driver 440 share the first high-voltage line VGHL, and the first scan driver 410, the third scan driver 430, and the emission control driver 450 share the second high-voltage line VGHO. Accordingly, it may prevent the voltage fluctuation of the emission signal from being reflected in the voltage of the gate electrode of the first transistor ST1 by the second parasitic capacitor Cpr2. Hereinafter, it will be described in detail with reference to FIG. 16.

Figure 16:
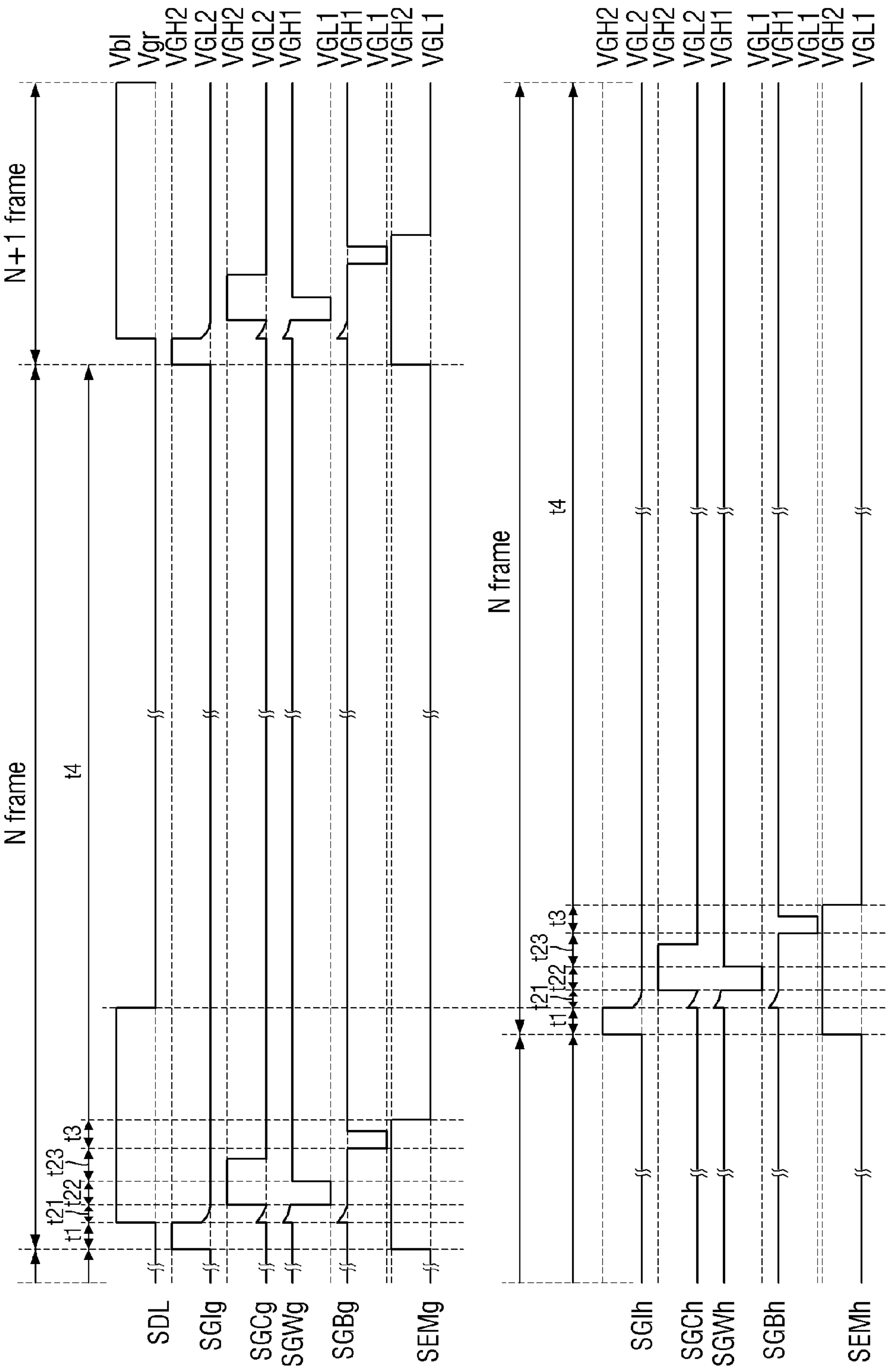
FIG. 16 is a waveform diagram of signals applied to scan lines and emission lines of each of the $g^{th}$ row and the $h^{th}$ row, and signals applied to data lines when a display device of FIG. 3 displays the screen of FIG. 13.

FIG. 16 is a waveform diagram of signals applied to scan lines and emission lines of each of the $g^{th}$ row and the $h^{th}$ row, and signals applied to data lines in case that a display device according to an embodiment displays the image of FIG. 13.

For simplicity of description, FIG. 16 illustrates that a display device according to an embodiment displays the image of FIG. 13 in an $N^{th}$ frame period.

As illustrated in FIG. 16, SGIg indicates a first scan signal applied to the first scan line GI disposed in the $g^{th}$ row, SGWg indicates a second scan signal applied to the second scan line GW disposed in the $g^{th}$ row, SGCg indicates a third scan signal applied to the third scan line GC disposed in the $g^{th}$ row, SGBg indicates a fourth scan signal applied to the fourth scan line GB disposed in the $g^{th}$ row, and SEMg indicates an emission signal applied to the emission line EM disposed in the $g^{th}$ row.

In addition, SGIh indicates to a first scan signal applied to the first scan line GI disposed in the $h^{th}$ row, SGWh indicates a second scan signal applied to the second scan line GW disposed in the $h^{th}$ row, SGCh indicates a third scan signal applied to the third scan line GC disposed in the $h^{th}$ row, SGBh indicates a fourth scan signal applied to the fourth scan line GB disposed in the $h^{th}$ row, and SEMh indicates an emission signal applied to the emission line EM disposed in the $h^{th}$ row.

Referring to FIG. 16, a voltage of the data signal SDL applied to the data line DL in the first sub-period t21 of the second period t2 during the $N^{th}$ frame period to display the $g^{th}$ row of FIG. 13 may be changed from the gray voltage Vgr to the black voltage Vbl.

At this time, since each of the first scan signal SGIg and the third scan signal SGCg outputs the second low voltage VGL2, the voltage of the second low voltage line VGLO may rise and then recover to the second low voltage VGL2 because of the coupling between the data line DL and the first scan line GI and between the data line DL and the third scan line GC.

Since each of the second scan signal SGWg and the fourth scan signal SGBg outputs the first high voltage VGH1, the voltage of the first high voltage line VGHL may rise and then recover to the first high voltage VGH1 because of the coupling between the data line DL and the second scan line GW and between the data line DL and the fourth scan line GB.

However, in case that the voltage of the data signal SDL is changed from the gray voltage Vgr to the black voltage Vbl, the emission signal SEMg has the second high voltage VGH2, so the emission signal SEMg may be maintained almost constant at the second high voltage VGH2. Accordingly, it may prevent the second high voltage VGH2 of the emission signal SEMg from increasing at the boundary between the gray image G and the black image B as illustrated in the $g^{th}$ row of FIG. 14. Accordingly, it may prevent the occurrence of horizontal crosstalk in which the user visually recognizes the bright gray line BGL having a luminance different from that of adjacent rows.

Similarly, although the data signal SDL is changed from the black voltage Vbl to the gray voltage Vgr to display the $h^{th}$ row, the second high voltage VGH2 of the emission signal SEMh remains almost constant, so that as the voltage of the emission signal SEMh is lowered and restored at the boundary between the black image B and the gray image G as illustrated in the $h^{th}$ row in FIG. 14, the voltage of the gate electrode of the first transistor ST1 is boosted by the second parasitic capacitor Cpr2, and the driving current Isd decreases, and thus the occurrence of horizontal crosstalk in which the user visually recognizes the dark gray line GDL having a luminance different from that of adjacent rows may be prevented.

In summary, since the first scan signal of the first scan driver 410 and the third scan signal of the third scan driver 430 are signals for controlling the turn-on of the N-channel transistor, the first and third scan signals have the second low voltage VGL2 during a period of approximately 95% or more of the duration of one frame period. Accordingly, because of the coupling between the data line DL and the first scan line GI and the coupling between the data line DL and the third scan line GC, although the voltage fluctuation of the data line DL is reflected in the first scan lines GI and the third scan lines GC, the second high voltage VGH2 is hardly affected. For example, the second high voltage VGH2 of the emission signal of the emission control driver 450 may be maintained substantially constant regardless of a potential fluctuation of the first high voltage VGH1. Accordingly, it may prevent the voltage fluctuation of the emission signal from being reflected on the voltage of the gate electrode of the first transistor ST1 by the second parasitic capacitor Cpr2.

Figure 17:
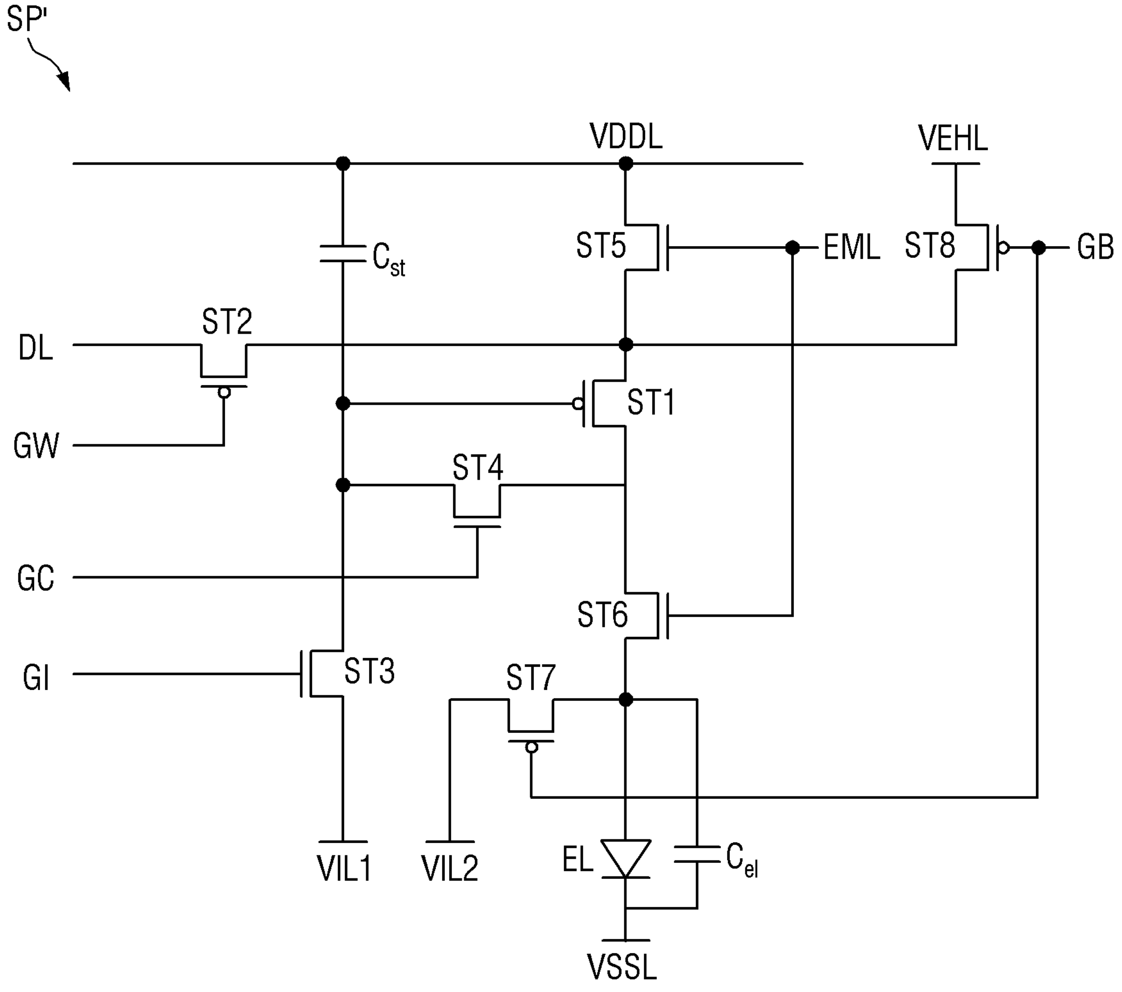
FIG. 17 is a schematic circuit diagram according to another example of the sub-pixel of FIG. 3.

FIG. 17 is a schematic circuit diagram according to another example of the sub-pixel of FIG. 3.

The embodiment of FIG. 17 is different from the embodiment of FIG. 6 at least in that the fifth transistor ST5 and the sixth transistor ST6 of a sub-pixel SP' are formed of N-channel transistors. Differences from the embodiment of FIG. 6 will be mainly described with reference to FIG. 17.

Each of the fifth transistor ST5 and the sixth transistor ST6 may be formed of the N-channel transistor. In this case, the emission signal applied from the emission line EM electrically connected to the gate electrode of each of the fifth transistor ST5 and the sixth transistor ST6 should be corrected. For example, in FIG. 7, an emission signal SEM should have the second gate-on voltage Von2 during the fourth period t4 and have the first gate-on voltage Von1 during the remaining periods t1, t2, and t3. For example, the emission signal SEM should have the second high voltage VGH2 during the fourth period t4 and have the first low voltage VGL1 during the remaining periods t1, t2, and t3.

The emission signal SEM may have the first low voltage VGH1 during the first period t1 and the second period t2 of FIG. 15. Since the second scan signal of the second scan driver 420 and the fourth scan signal of the fourth scan driver 440 are signals for controlling the turn-on of the P-channel transistor, the second and fourth scan signals have the first high voltage VGH1 during a period of approximately 95% or more of the duration of one frame period. Accordingly, because of the coupling between the data line DL and the second scan line GW and the coupling between the data line DL and the fourth scan line GB, although the voltage fluctuation of the data line DL is reflected in the second scan lines GW and the fourth scan lines GB, the first low voltage VGL1 is hardly affected. Accordingly, it may prevent the voltage fluctuation of the emission signal SEM from causing the fluctuation of the voltage of the gate electrode of the first transistor ST1 by the second parasitic capacitor Cpr2.

Figure 18:
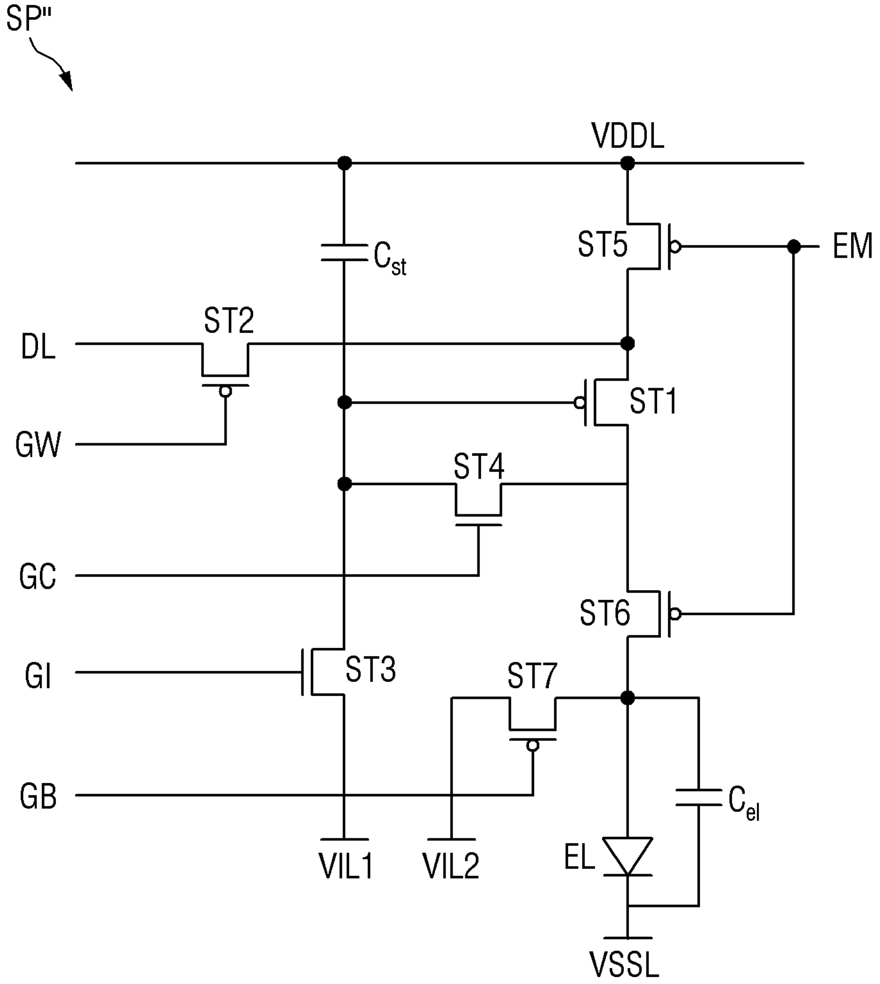
FIG. 18 is a schematic circuit diagram according to still another example of the sub-pixel of FIG. 3.

FIG. 18 is a schematic circuit diagram according to still another example of the sub-pixel of FIG. 3.

Figure 19:
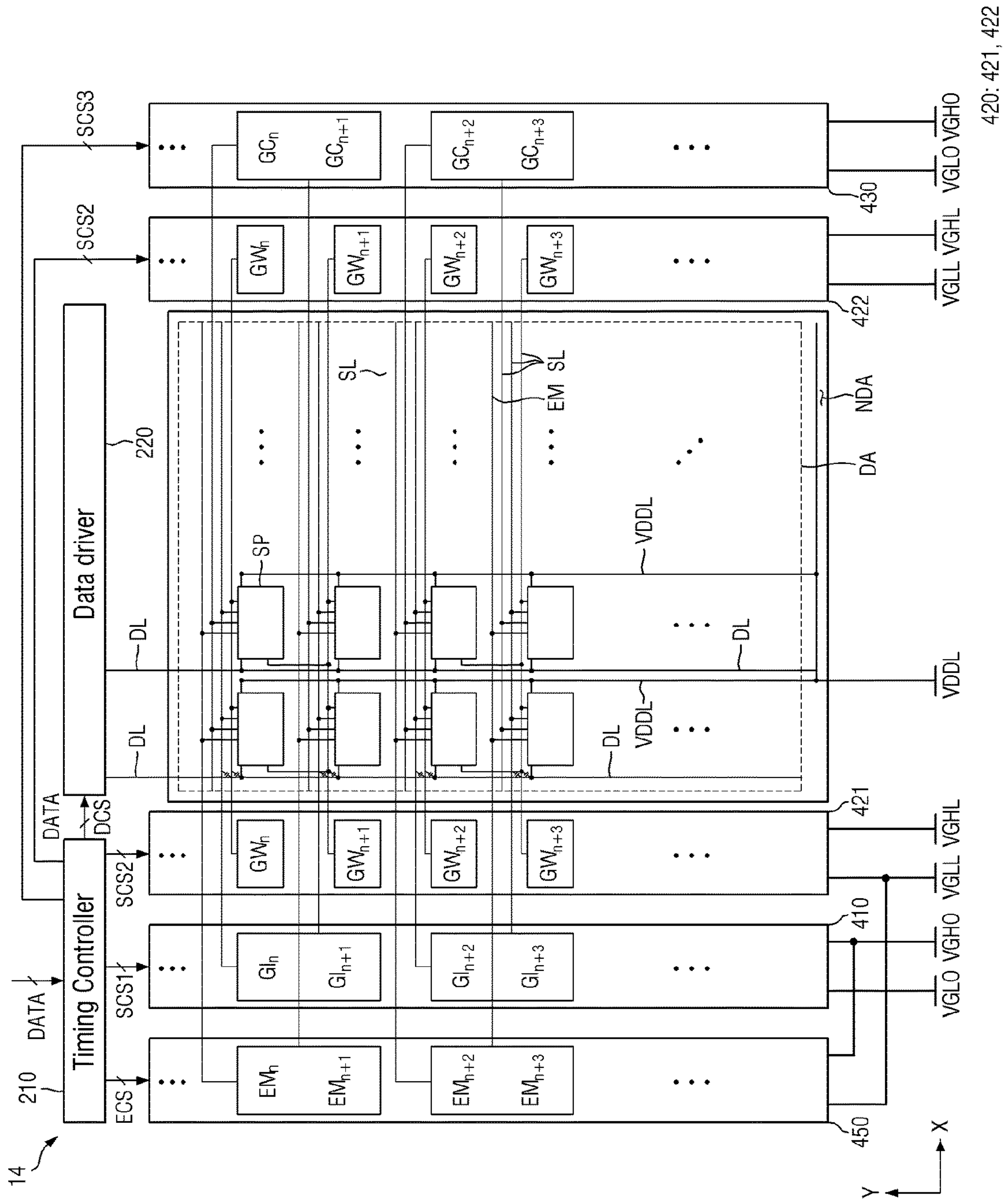
FIG. 19 is a schematic block diagram of a display device according to another embodiment.

FIG. 19 is a block diagram of a display device according to another embodiment.

A sub-pixel SP" of FIG. 18 is different at least in that the bias voltage line VEHL and the eighth transistor ST8 are omitted, and may be substantially the same as the sub-pixel SP of FIG. 6.

However, in case that the eighth transistor ST8 is omitted, the fourth scan signal applied to the fourth scan line GB may be modified. For example, the fourth scan signal may have the first gate-on voltage Von1 in the first period t1 of FIG. 8 or may have the first gate-on voltage Von1 in the second period t2. In addition, the fourth scan line GB may be omitted, the second scan line GW of the current pixel may be electrically connected to the gate electrode of the seventh transistor ST7, and accordingly, the fourth scan driver may be omitted as illustrated in FIG. 19.

Figure 20:
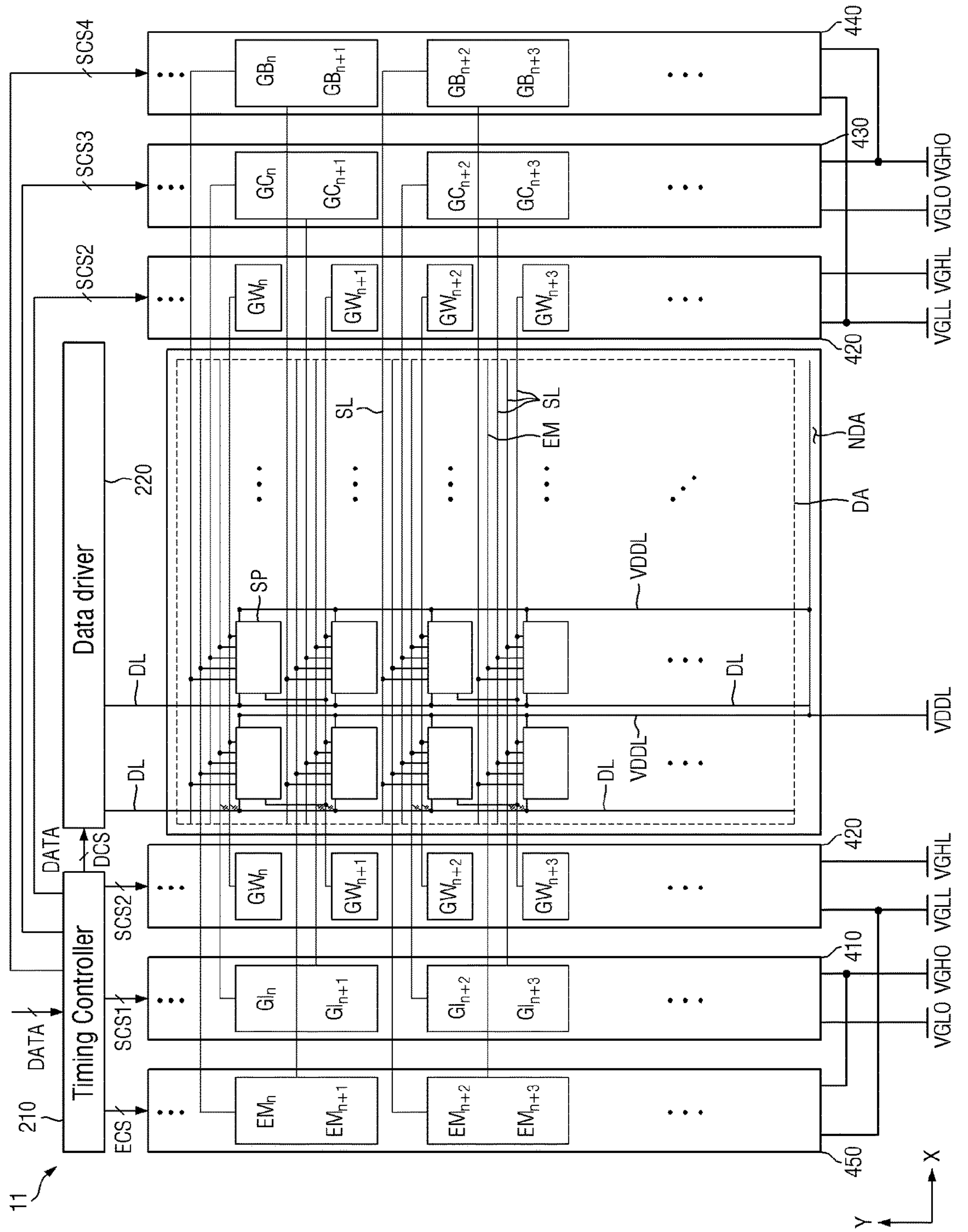
FIG. 20 is a schematic block diagram of a display device according to another embodiment.
Figure 21:
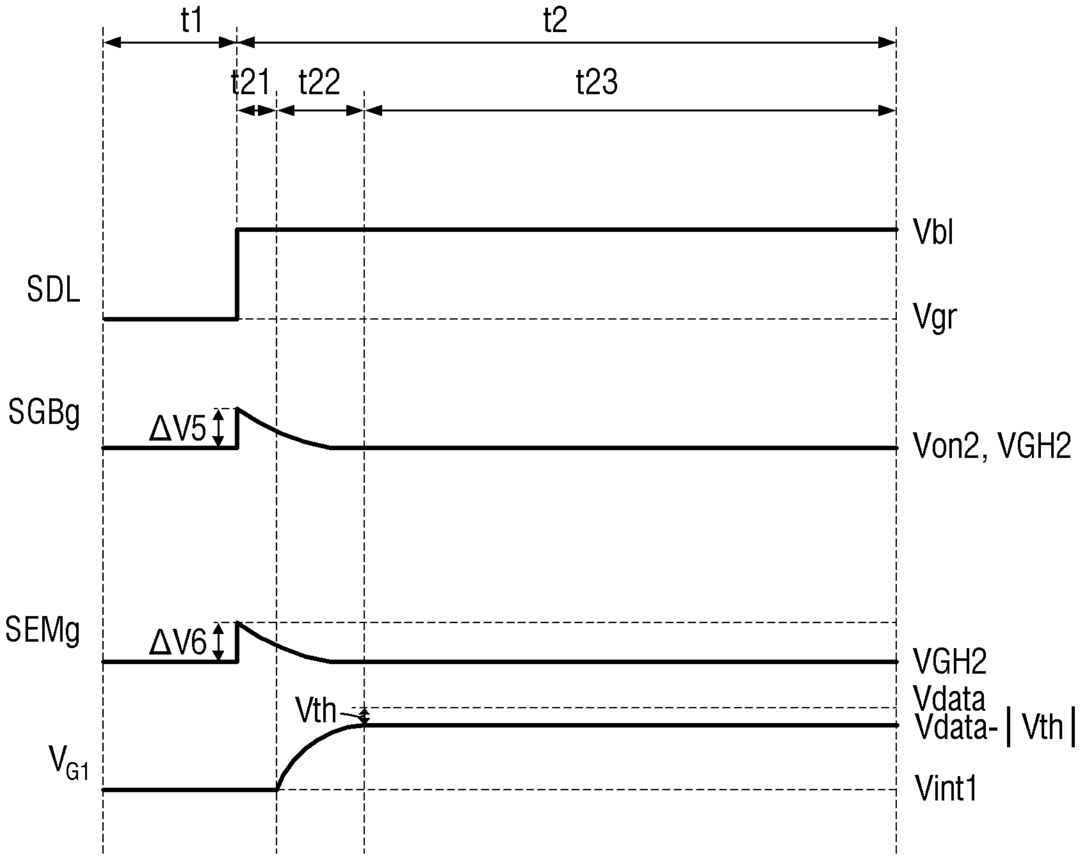
FIG. 21 is a timing diagram illustrating an example of a voltage change of a gate electrode of a first transistor according to the display device of FIG. 20.

FIG. 20 is a schematic block diagram of a display device according to another embodiment. FIG. 21 is a schematic timing diagram illustrating an example of a voltage change of a gate electrode of a first transistor according to the display device of FIG. 20.

A display device 11 according to the embodiment of FIG. 20 is different from that of the embodiment of FIG. 3 at least in that the second high-voltage line VGHO is electrically connected to the fourth scan driver 440.

As illustrated in FIG. 20, the emission control driver 450 shares the second high-voltage line VGHO instead of the first high-voltage line VGHL with the first scan driver 410, the third scan driver 430, and the fourth scan driver 440. For example, the emission control driver 450, the first scan driver 410, the third scan driver 430, and the fourth scan driver 440 share the second high-voltage line VGHO, and the second scan driver 420 uses the first high-voltage line VGHL alone.

Since the fourth scan signal of the fourth scan driver 440 is a signal for controlling the turn-on of the P-channel transistor, the fourth scan signal has the second high voltage VGH2 during a period of approximately 95% or more of the duration of one frame period. Accordingly, because of the coupling between the data line DL and the fourth scan lines GB, a voltage fluctuation of the data line DL may be reflected in the fourth scan lines GB. In this case, the second high voltage VGH2 may be affected. However, since the first scan signal of the first scan driver 410 is a signal for controlling the turn-on of the N-channel transistor, the first scan signal has the second high voltage VGH2 during a period of approximately 5% or less of the duration of one frame period.

Accordingly, a period in which the first scan signal and the fourth scan signal simultaneously have the second high voltage VGH2 during one frame period may be smaller than a period in which the second scan signal and the fourth scan signal simultaneously have the first high voltage VGH1 during one frame period as the second scan driver 420 and the fourth scan driver 440 share the first high-voltage line VGHL.

For example, in case that the first scan driver 410 and the fourth scan driver 440 share the second high-voltage line VGHO so that the fourth scan signal has the second high voltage VGH2 may be relatively stable from the voltage fluctuation of the data signal, compared to a case where the second scan driver 420 and the fourth scan driver 440 share the first high-voltage line VGHL so that the fourth scan signal has the first high voltage VGH1.

Accordingly, although the emission control driver 450, the first scan driver 410, the third scan driver 430, and the fourth scan driver 440 share the second high voltage VGH2, as illustrated in FIG. 21, the voltage fluctuation of the second high voltage VGH2 may be smaller than the voltage fluctuation of the first high voltage VGH1 in case that the second scan driver 420 and the fourth scan driver 440 share the first high-voltage line VGHL, for example, the voltage fluctuation of the first high voltage VGH1 illustrated in FIG. 15.

Specifically, the magnitude of a fifth voltage difference ΔV5 in which the voltage of the fourth scan signal SGBg of FIG. 21 is raised by the data signal SDL may be smaller than the magnitude of the first voltage difference ΔV1 in which the voltage of the second scan signal SGWg of FIG. 15 is raised by the data signal SDL. Accordingly, a sixth voltage difference ΔV6 in which the emission signal SEMg of the emission line EM that has been outputting the second high voltage VGH2 rises may be smaller than the second voltage difference ΔV2 of FIG. 15.

Accordingly, although the emission signal SEMg of the emission control driver 450 is raised by the sixth voltage difference ΔV6, the emission signal SEMg may be restored to the second high voltage VGH2 before "Vdata−|Vth|" is sampled at the gate electrode of the first transistor ST1.

Accordingly, after "Vdata−|Vth|" is sampled at the gate electrode of the first transistor ST1, it may prevent the voltage fluctuation of the emission signal from being reflected in the gate electrode of the first transistor ST1 by the second parasitic capacitor Cpr2.

Figure 22:
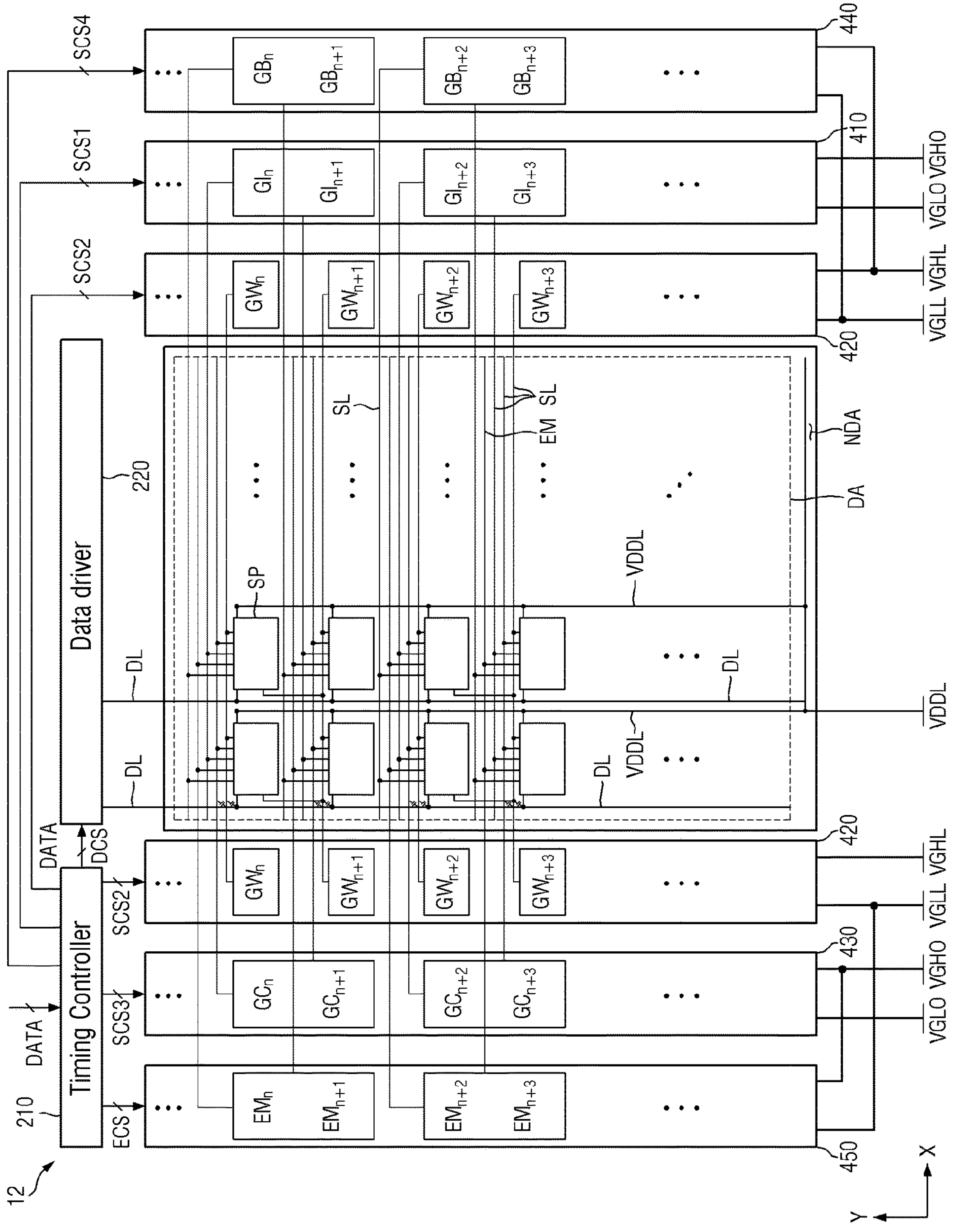
FIG. 22 is a schematic block diagram of a display device according to still another embodiment.

FIG. 22 is a schematic block diagram of a display device according to still another embodiment.

A display device 12 according to the embodiment of FIG. 22 is different from the embodiment of FIG. 3 at least in that the first scan driver 410 is disposed on a right side of the display area DA, and the third scan driver 430 is disposed on a left side of the display area DA, and thus a description of FIG. 20 will be omitted.

Figure 23:
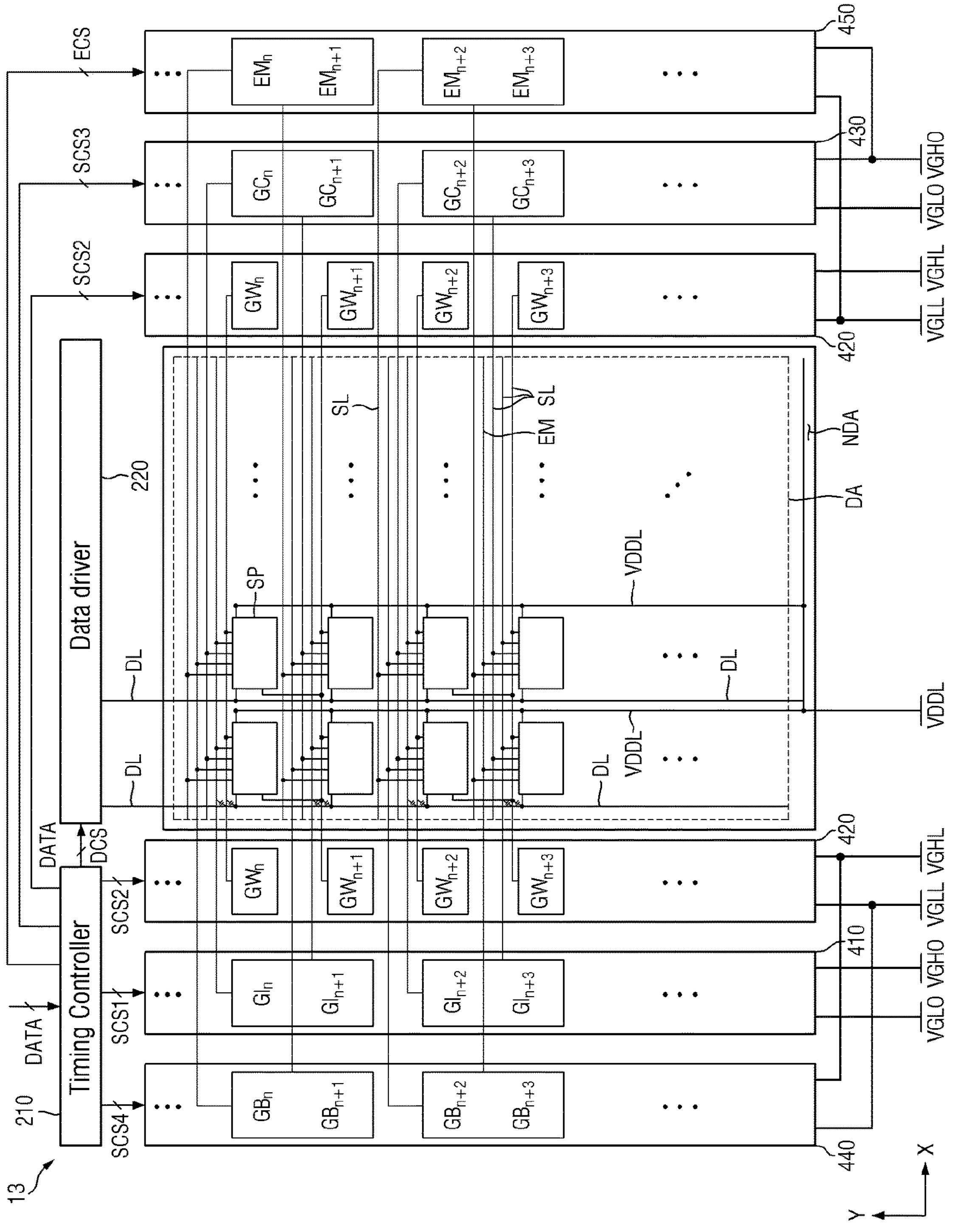
FIG. 23 is a schematic block diagram of a display device according to still another embodiment.

FIG. 23 is a schematic block diagram of a display device according to still another embodiment.

A display device 13 according to the embodiment of FIG. 23 is different from that in the embodiment of FIG. 3 at least in that the emission control driver 450 is disposed on a right side of the display area DA, and the fourth scan driver 440 is disposed on a left side of the display area DA, and thus a description of FIG. 21 will be omitted.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A display device comprising:

a plurality of pixels electrically connected to first scan lines, second scan lines, and emission lines;

a first scan driver that applies first scan signals to the first scan lines;

a second scan driver that applies second scan signals to the second scan lines;

an emission control driver that applies emission signals to the emission lines; and a power supply that generates a first high voltage to output the first high voltage through a first high-voltage line and generates a second high voltage to output the second high voltage through a second high-voltage line, wherein the second scan driver is electrically connected the first high-voltage line, and the first scan driver and the emission control driver are electrically connected the second high-voltage line.

2. The display device of claim 1, further comprising:

third scan lines; and a third scan driver that applies third scan signals to the third scan lines, wherein the third scan driver is electrically connected the second high-voltage line.

3. The display device of claim 2, further comprising:

fourth scan lines; and a fourth scan driver that applies fourth scan signals to the fourth scan lines, wherein the fourth scan driver is electrically connected the first high-voltage line.

4. The display device of claim 3, wherein the power supply generates a first low voltage to output the first low voltage through a first low-voltage line and generates a second low voltage to output the second low voltage through a second low-voltage line, the first scan driver and the third scan driver are electrically connected the second low-voltage line, and the second scan driver, the fourth scan driver, and the emission control driver are electrically connected the first low-voltage line.

5. The display device of claim 4, further comprising:

data lines;

a first driving voltage line; and a first initialization voltage line electrically connected to each of a plurality of sub-pixels, wherein each of the plurality of sub-pixels comprises:

a light emitting element;

a first transistor that applies a driving current to the light emitting element according to a voltage of a gate electrode;

a second transistor that applies a data voltage of the data line to a first electrode of the first transistor according to a second scan signal of the second scan line;

a third transistor that initializes the gate electrode of the first transistor to a first initialization voltage of the first initialization voltage line according to a first scan signal of the first scan line; and a fourth transistor that electrically connects the first driving voltage line and the first electrode of the first transistor according to the emission signal of the emission line.

6. The display device of claim 5, further comprising:

a second initialization voltage line electrically connected to each of the plurality of sub-pixels, wherein each of the plurality of sub-pixels further comprises:

a fifth transistor that electrically connects the gate electrode and a second electrode of the first transistor according to a third scan signal of the third scan line;

a sixth transistor that initializes an anode electrode of the light emitting element to a second initialization voltage of the second initialization voltage line according to a fourth scan signal of the fourth scan line; and a seventh transistor that electrically connects the second electrode of the first transistor and the anode electrode of the light emitting element according to the emission signal of the emission line.

7. The display device of claim 6, wherein each of the first transistor, the second transistor, the fourth transistor, the sixth transistor, and the seventh transistor is a P-channel transistor, and each of the third transistor and the fifth transistor is an N-channel transistor.

8. The display device of claim 6, wherein each of the first transistor, the second transistor, and the sixth transistor is a P-channel transistor, and each of the third transistor, the fourth transistor, the fifth transistor, and the seventh transistor is an N-channel transistor.

9. The display device of claim 6, further comprising:

a bias voltage line electrically connected to each of the plurality of sub-pixels, wherein each of the plurality of sub-pixels further comprises an eighth transistor that applies a bias voltage of the bias voltage line to the first electrode of the first transistor according to a fourth scan signal of the fourth scan line.

10. The display device of claim 4, further comprising:

a display area in which the plurality of pixels are disposed and display an image; and a non-display area disposed adjacent to the display area, wherein the second scan driver comprises:

a first sub-scan driver that applies second scan signals to the second scan lines and is disposed on a side of the non-display area; and a second sub-scan driver that applies second scan signals to the second scan lines and is disposed on another side opposite to the side of the non-display area.

11. The display device of claim 10, wherein the first scan driver and the emission control driver are disposed on the side of the non-display area, and the third scan driver and the fourth scan driver are disposed on the another side of the non-display area.

12. The display device of claim 10, wherein the third scan driver and the emission control driver are disposed on the side of the non-display area, and the first scan driver and the fourth scan driver are disposed on the another side of the non-display area.

13. The display device of claim 2, further comprising:

fourth scan lines; and a fourth scan driver that applies fourth scan signals to the fourth scan lines, wherein the fourth scan driver is electrically connected the second high-voltage line.

14. A display device comprising:

a sub-pixel electrically connected to a first scan line, a second scan line, an emission line, a data line, a first driving voltage line, and a first initialization voltage line, wherein the sub-pixel comprises:

a light emitting element;

a first transistor that applies a driving current to the light emitting element according to a voltage of a gate electrode;

a second transistor that applies a data voltage of the data line to a first electrode of the first transistor according to a second scan signal of the second scan line;

a third transistor that initializes the gate electrode of the first transistor to a first initialization voltage of the first initialization voltage line according to a first scan signal of the first scan line; and a fourth transistor that electrically connects the first driving voltage line and the first electrode of the first transistor according to an emission signal of the emission line, the second transistor is turned off during a period in which a first high voltage of the second scan signal is applied, the third transistor is turned on during a period in which a second high voltage of the first scan signal is applied, the fourth transistor is turned off during a period in which a second high voltage of the emission signal is applied, and the second high voltage of the first scan signal and the second high voltage of the emission signal are the same and different from first high voltage of the second scan signal.

15. The display device of claim 14, the second transistor is turned on during a period in which a first low voltage of the second scan signal is applied, the third transistor is turned off during a period in which a second low voltage of the first scan signal is applied, the fourth transistor is turned on during a period in which a first low voltage of the emission signal is applied, and the first low voltage of the second scan signal and the first low voltage of the emission signal are the same and different from the second low voltage of the first scan signal.

16. The display device of claim 15, further comprising:

a third scan line electrically connected to the sub-pixel, wherein the sub-pixel further comprises a fifth transistor that electrically connects the gate electrode and the first electrode of the first transistor according to a third scan signal of the third scan line, the fifth transistor is turned on during a period in which a second high voltage of the third scan signal is applied, and is turned off during a period in which a second low voltage of the third scan signal is applied, and the second high voltage of the third scan signal and the second high voltage of the emission signal are the same.

17. The display device of claim 16, further comprising:

a fourth scan line and a second initialization voltage line electrically connected to the sub-pixel, wherein the sub-pixel further comprises a sixth transistor that initializes an anode electrode of the light emitting element to a second initialization voltage of the second initialization voltage line according to a fourth scan signal of the fourth scan line, the sixth transistor is turned on during a period in which a first low voltage of the fourth scan signal is applied, and the first low voltage of the fourth scan signal and the first low voltage of the emission signal are the same.

18. The display device of claim 17, wherein the sub-pixel further comprises a seventh transistor that electrically connects a second electrode of the first transistor and the anode electrode of the light emitting element according to the emission signal of the emission line, and the seventh transistor is turned off during a period in which the second high voltage of the emission signal is applied, and is turned on during a period in which the first low voltage of the emission signal is applied.

19. The display device of claim 18, further comprising:

a bias voltage line electrically connected to the sub-pixel, wherein the sub-pixel further comprises an eighth transistor that applies a bias voltage of the bias voltage line to the first electrode of the first transistor according to a fourth scan signal of the fourth scan line, and the eighth transistor is turned on during a period in which the first low voltage of the fourth scan signal is applied.

20. The display device of claim 19, wherein the sixth transistor is turned off during a period in which a first high voltage or a second high voltage of the fourth scan signal is applied, and the eighth transistor is turned off during a period in which the first high voltage or the second high voltage of the fourth scan signal is applied.

* * * * *